May 14, 1940.    S. MORTON    2,200,802
SIGNALING SYSTEM AND APPARATUS THEREFOR
Original Filed July 15, 1929    10 Sheets—Sheet 6
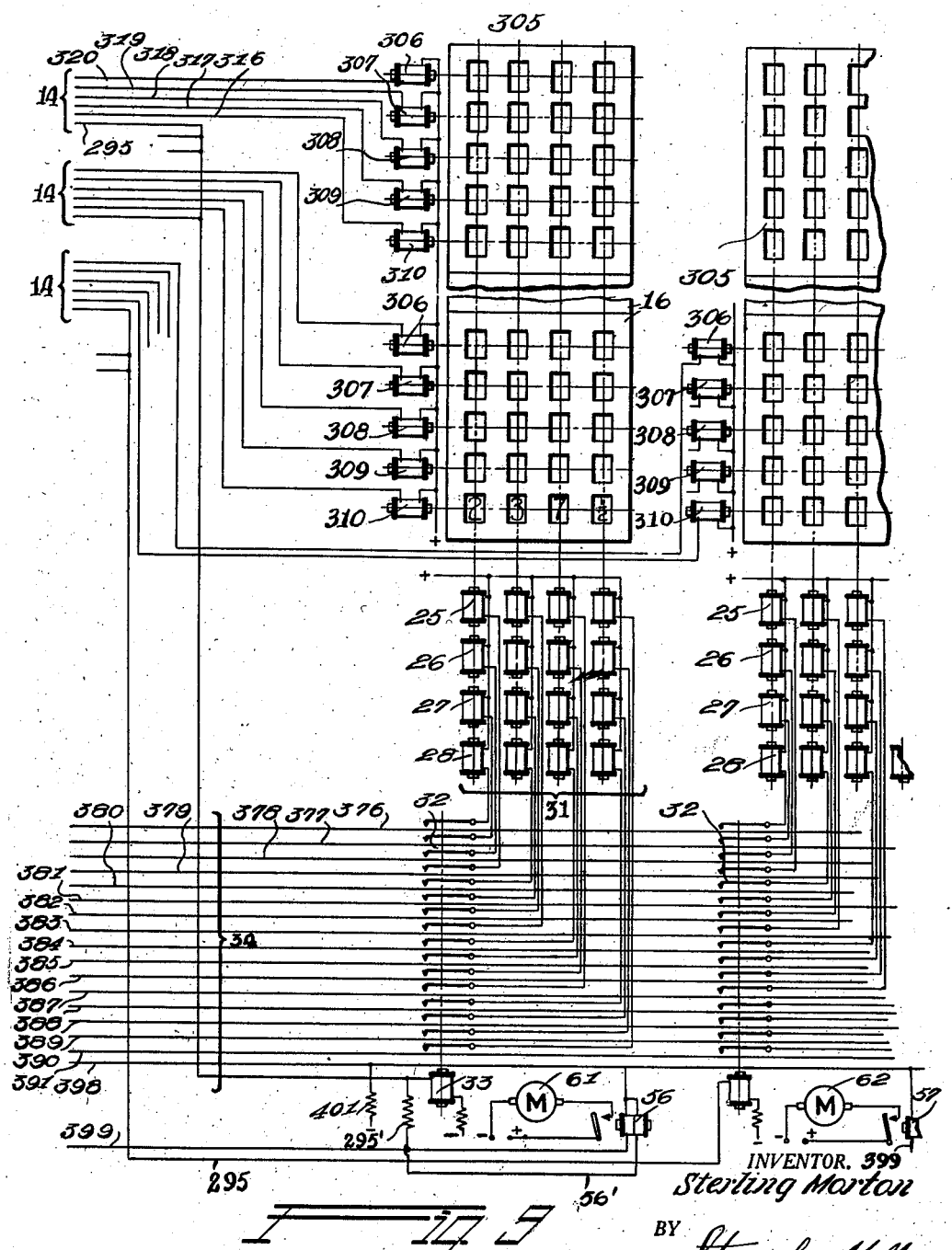
INVENTOR.
Sterling Morton
BY Strauch & Hoffman
ATTORNEYS

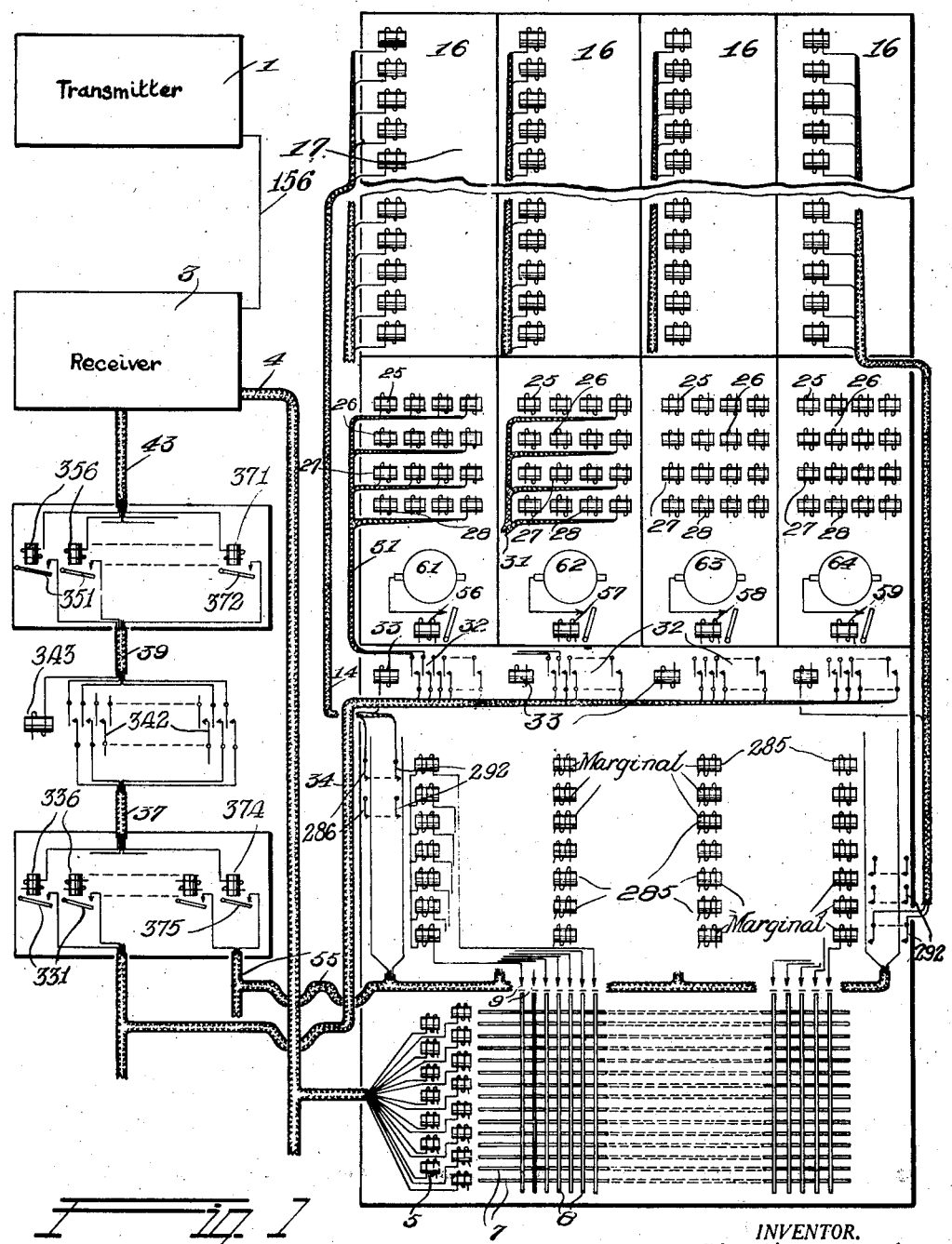

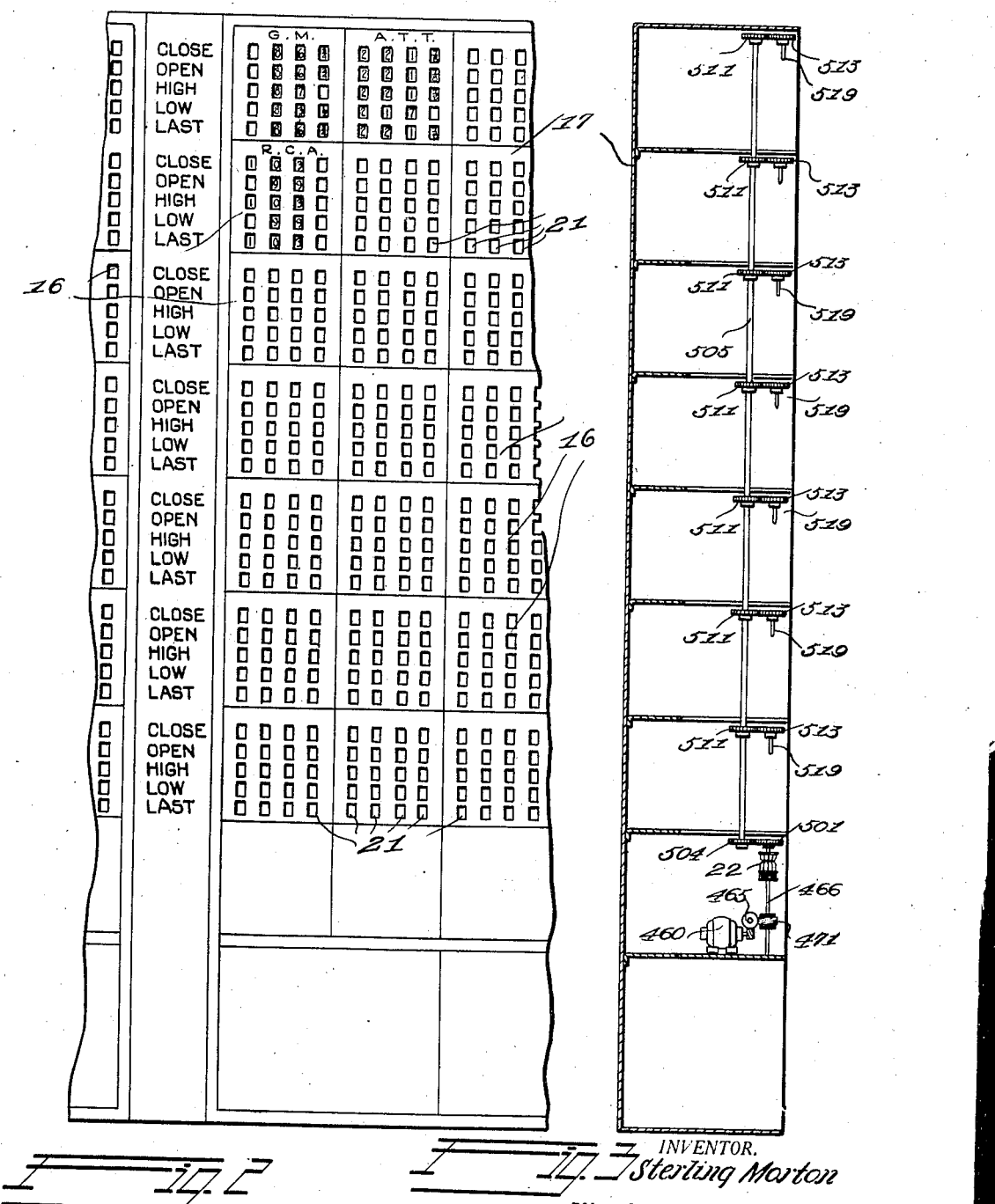

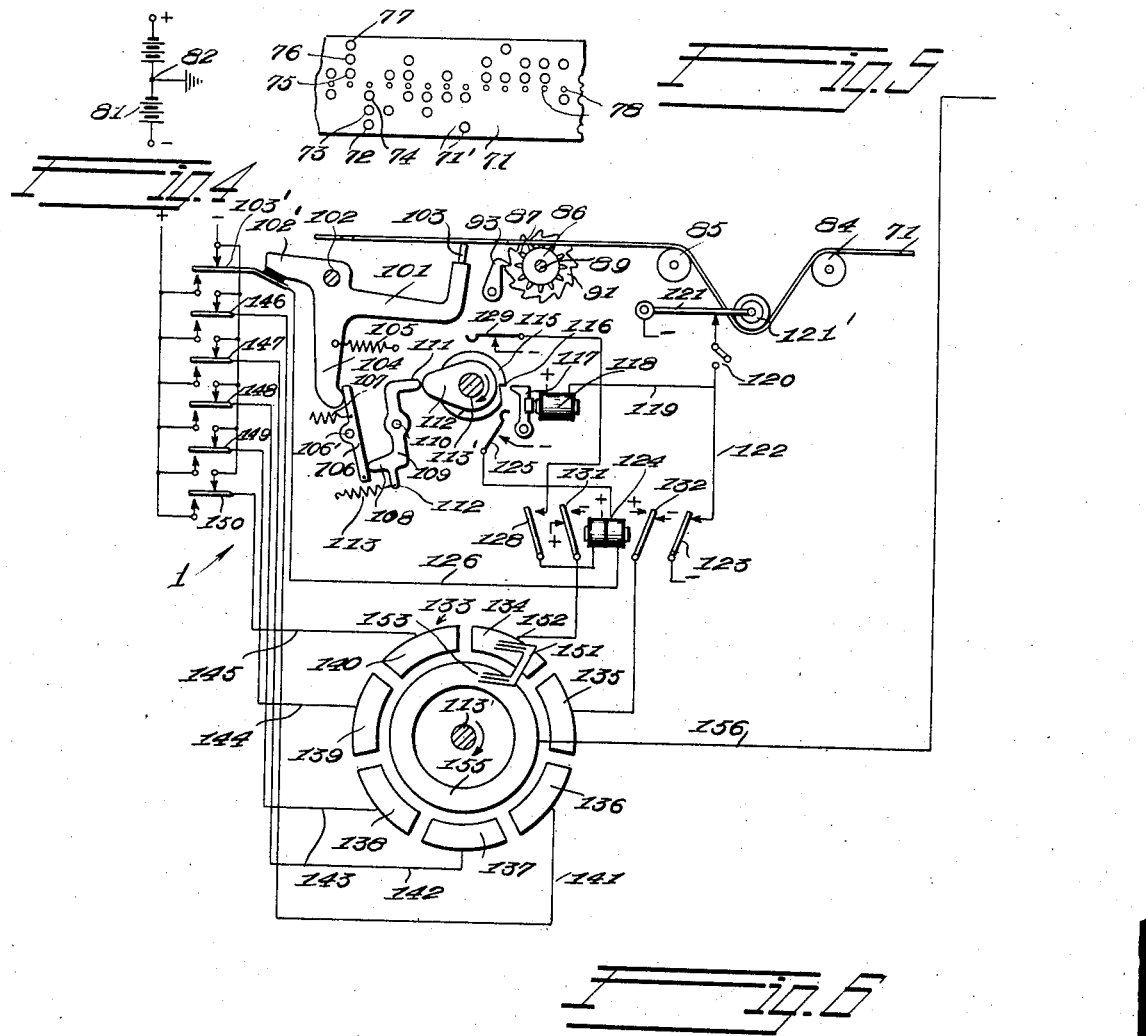

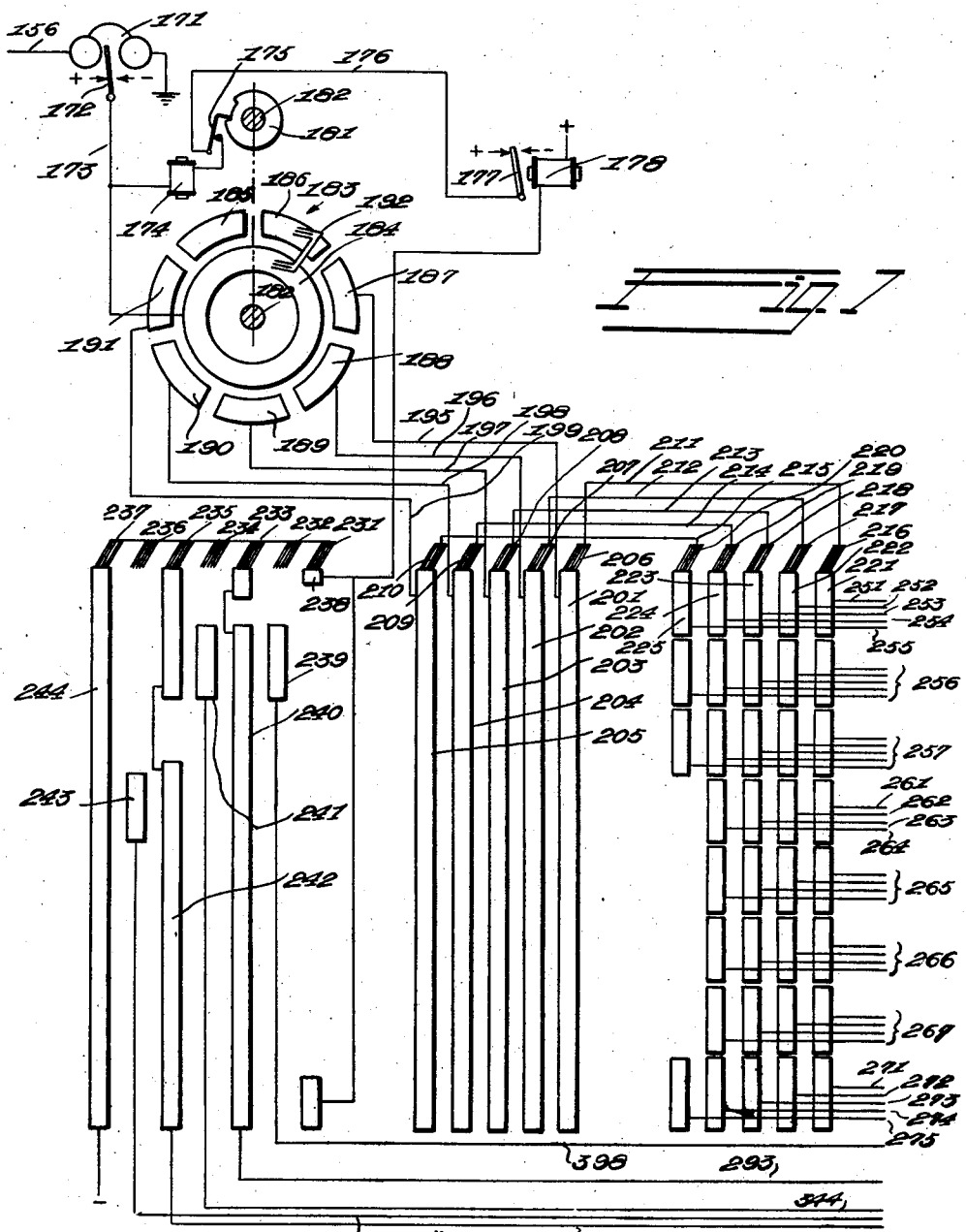

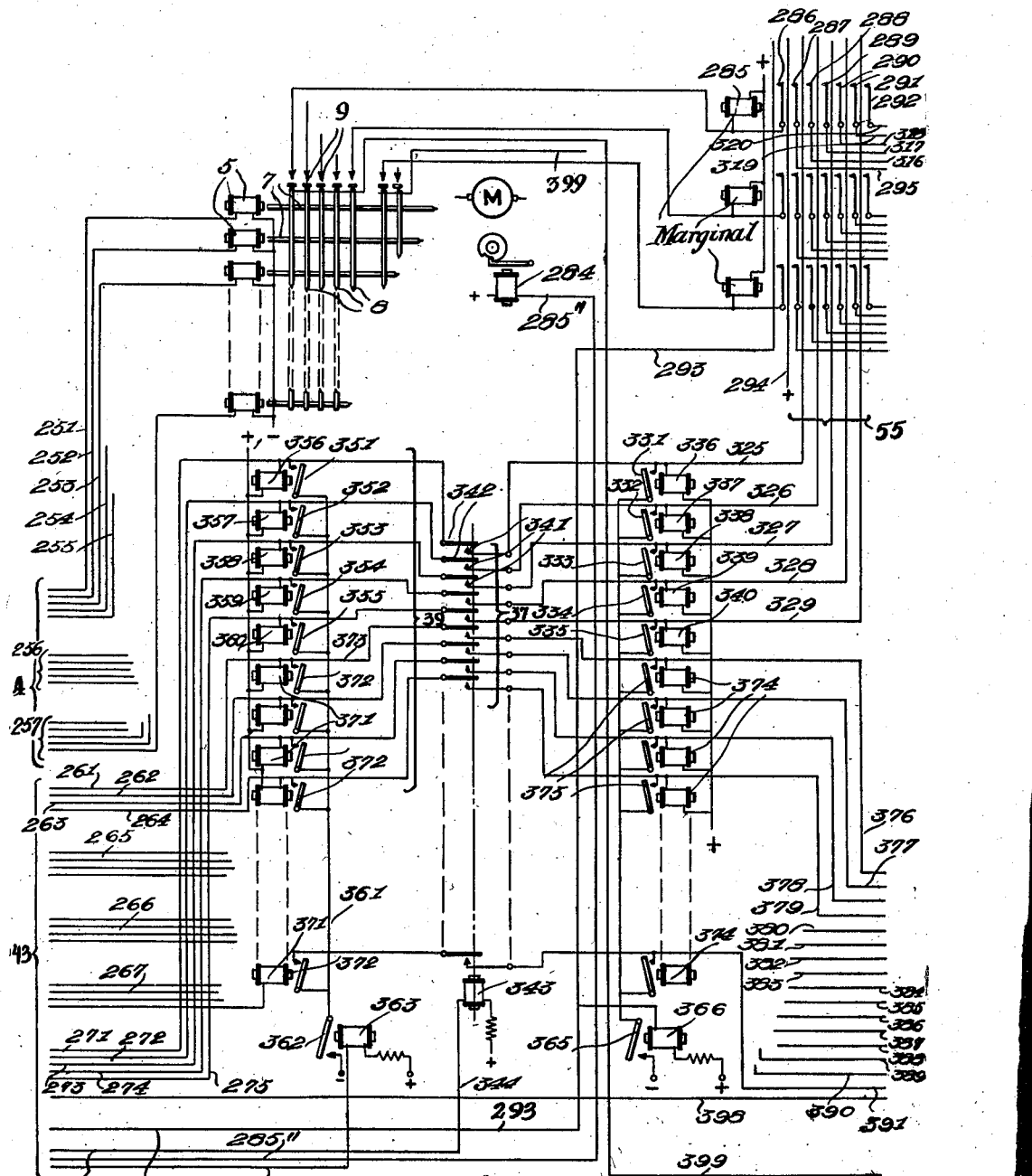

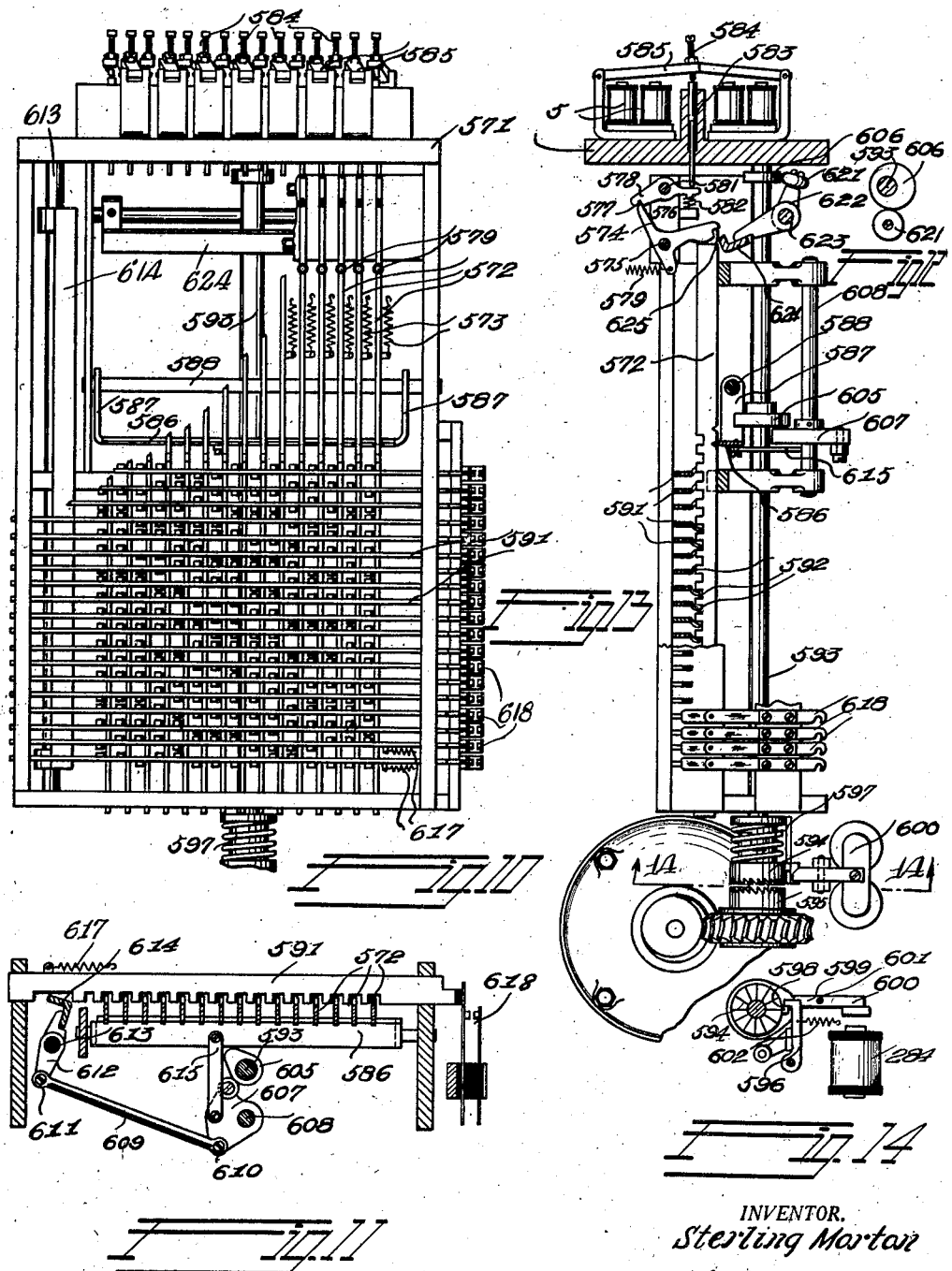

May 14, 1940.  S. MORTON  2,200,802
SIGNALING SYSTEM AND APPARATUS THEREFOR
Original Filed July 15, 1929  10 Sheets-Sheet 8
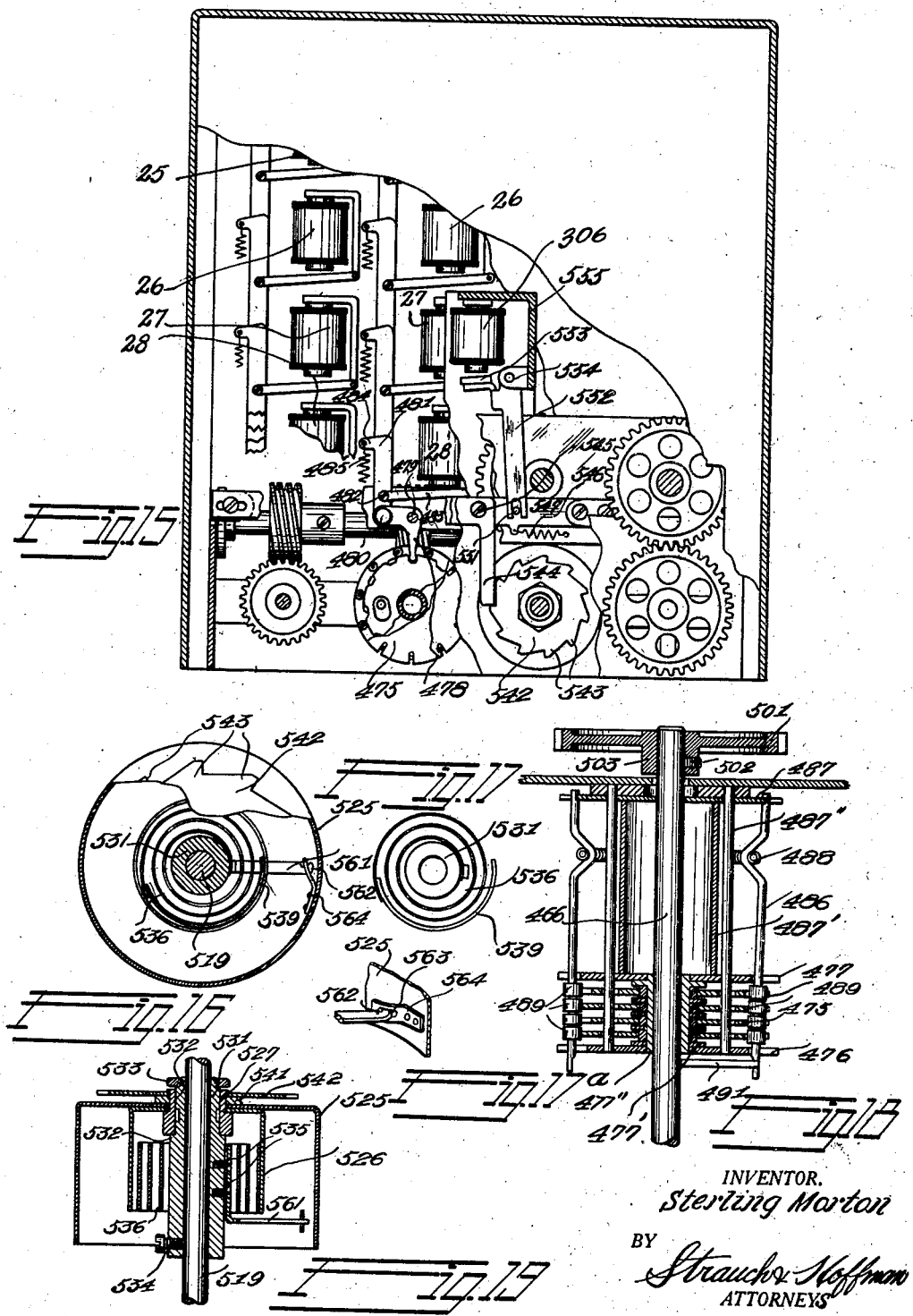
INVENTOR.
Sterling Morton
BY
Strauch & Hoffman
ATTORNEYS May 14, 1940.  S. MORTON  2,200,802
SIGNALING SYSTEM AND APPARATUS THEREFOR
Original Filed July 15, 1929   10 Sheets-Sheet 9
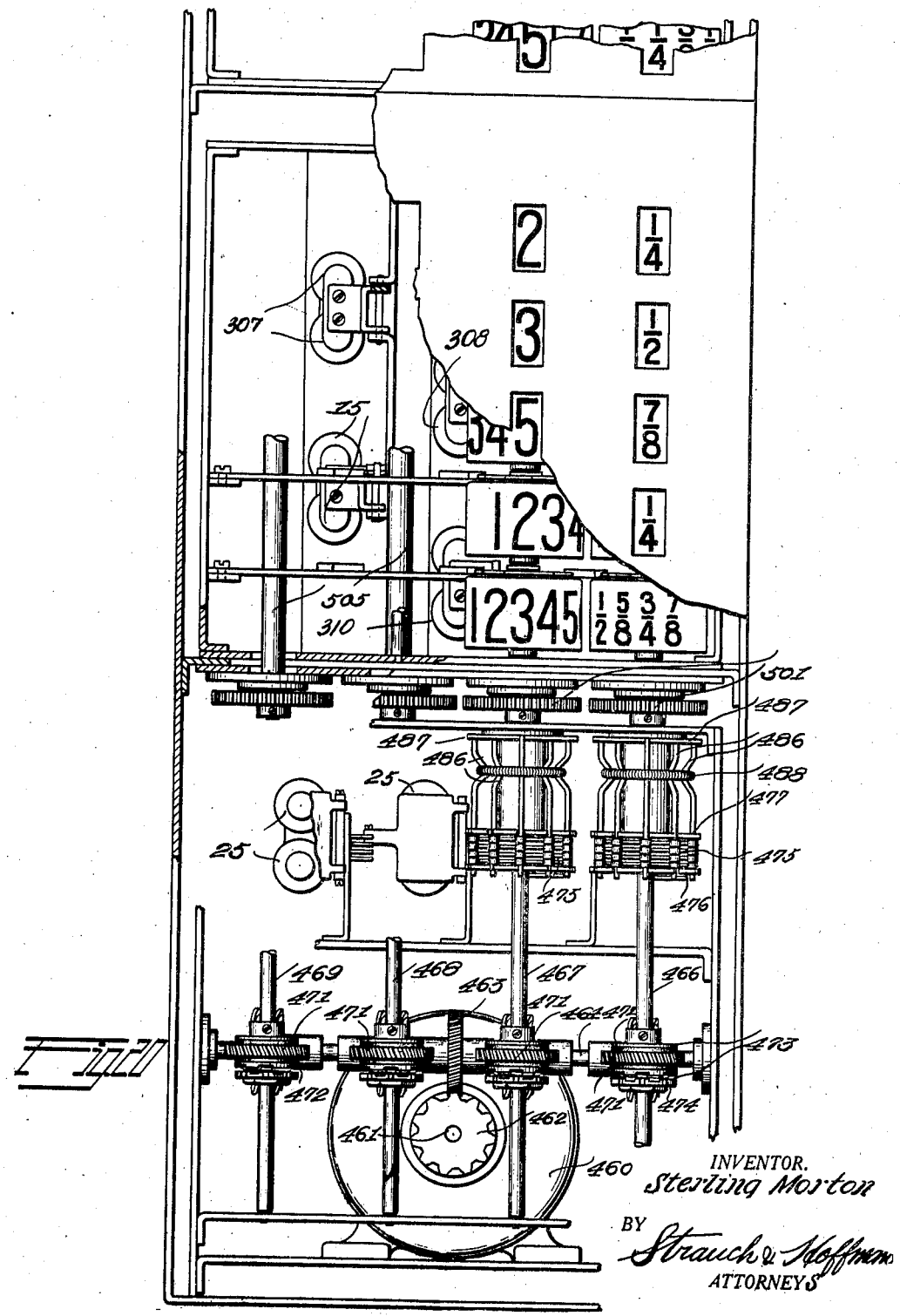
INVENTOR.
Sterling Morton
BY
Strauch & Hoffman
ATTORNEYS

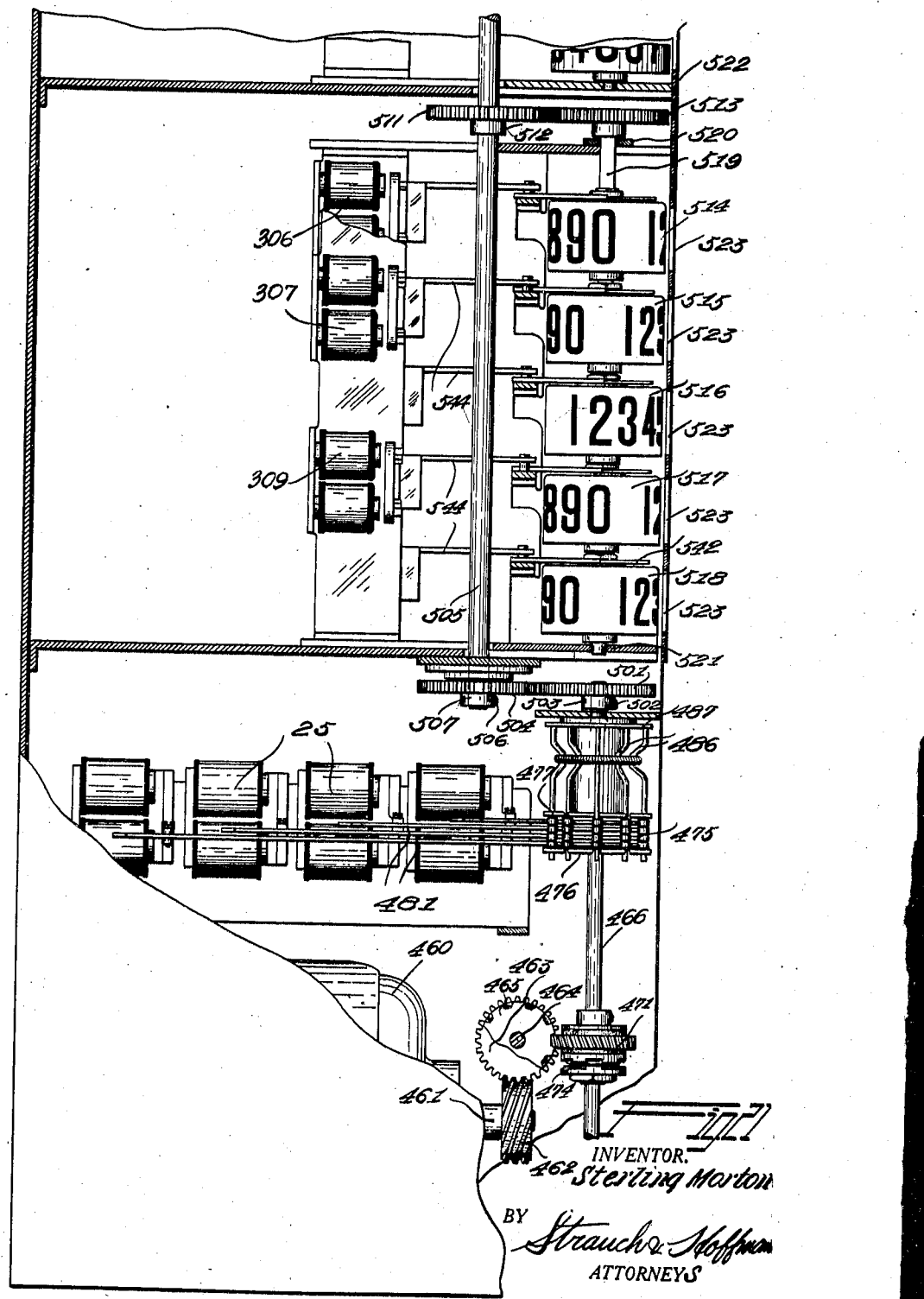

Patented May 14, 1940

2,200,802

UNITED STATES PATENT OFFICE 2,200,802

SIGNALING SYSTEM AND APPARATUS THEREFOR

Sterling Morton, Chicago, Ill., assignor to Teletype Corporation, Chicago, Ill., a corporation of Delaware Application July 15, 1929, Serial No. 378,463
Renewed October 21, 1939

36 Claims. (Cl. 177—353)

The present invention relates to signaling systems, and more particularly to recording and like systems, and is especially adapted for market quotation distribution and like uses.

In modern selective market quotation systems, remote selection of an item to be quoted is followed by selection of the price quotation of the selected item, and the range of the quotation. The proper functioning of the receiving and registering or recording apparatus to perform the successive operations requires predetermined time intervals for each successive operation. As quotation distribution signaling traffic is very heavy and signaling time available therefore is limited, a primary object of my invention is to provide novel overlap mechanisms and arrangements in such signaling systems to speed traffic and to reduce to a minimum the signal line time required for each cycle of operations.

The number of commodity items that are quoted is so great, and the use of any one indicator is so infrequently made that it has been regarded as impractical to employ the highly developed mechanical selector mechanisms commonly used in the printing telegraph art for the operation of individual quotation registers. Various types of electromagnetically or current operated registers have been heretofore proposed for such registers for example, as is illustrated in U. S. Patent 1,128,008 to Kramer. Such current operated devices are more or less unreliable in operation and subject to heavy maintenance costs. A further object of my invention is therefore to provide simplified mechanical selector mechanisms for quotation registers and recorders operable with the reliability of operation and comparatively low cost of maintenance of mechanical telegraph selectors.

A further object of the present invention is the provision of a receiving or recording system and apparatus of the character mentioned in which a single motor and set of selectors is used as common equipment for a plurality of sets of indicators or recorders arranged in groups.

A still further object of my invention is to provide simplified apparatus of the character mentioned responsive to a minimum amount of line energy.

Other objects of my invention will appear from the following disclosure of preferred embodiments thereof, and from the terms of the appended claims. As shown in the drawings:

Figure 1 is a diagrammatic view of the complete system showing the general outline of the receiving apparatus.

Figure 2 is a broken elevation of the assembly of a stock quotation board.

Figure 3 is a vertical sectional view of the assembly shown in Figure 2.

Figure 4 is a diagram of the system used in obtaining opposite electrical potentials.

Figure 5 is a fragmental plan view of the preferred form of perforated tape employed in connection with my system.

Figure 6 is a diagram of representative parts and connections of the transmitter embodied in my invention.

Figure 7 is a similar view showing the details of the receiving distributor employed in connection with Figure 6.

Figure 8 is a diagrammatic view showing the details of the circuits and apparatus in which the received codes are stored in a preferred embodiment of my invention.

Figure 9 is a general diagrammatic view of a display device upon which the translated intelligence is to be exhibited.

Figure 10 is a top plan view of the stock selector units.

Figure 11 is a cross section of the stock selector units indicated in Figure 10.

Figure 12 is a detail sectional view showing one of the operating cams of the selector units.

Figure 13 is a side elevation partially in section of the stock selector units.

Figure 14 is a detail section taken on line 14—14 of Figure 12 showing the start mechanism of the stock selector units.

Figure 15 is a top plan view partly in section showing some of the parts of the stock indicator units and the price selector units.

Figure 16 is a plan view partly in section of a single indicator.

Figure 17 is a plan view of the spring for rotating the drum.

Figure 17a is a fragmental perspective view showing the latching mechanism in the indicator drum.

Figure 18 is a vertical section of the price selecting device.

Figure 19 is a cross section of an indicator drum.

Figure 20 is a front elevational view partially in section of the price selector unit and indicators, and Figure 21 is a side elevation of the price selector unit and indicator unit.

As shown in Figure 1, a transmitter 1, the details of which will be described hereinafter, transmits code combinations of impulses in accordance with the stock item to be quoted and the quotation thereof over a signaling line 156 extending to a remote receiving apparatus 3. These codes are sent in groups, each group constituting a cycle comprising first a plurality of codes for selecting the items to be quoted, followed by other codes for indicating the quotations of the selected item and its range; that is, whether it is the high, low, opening, closing or current quotation. As will be described hereinafter, the receiving apparatus 3 comprises a distributor operating in response to the code combinations of impulses received over the signaling line 156 to distribute the first group of code combinations of impulses or item selecting codes for retransmission over conductors in a cable 4 extending to selector magnets 5.

Magnets 5 operate their individual code bars 7 variably in accordance with the received code combination of impulses. Positioned above and transversely of the bars 7 are selector bars 8 individual to each item to be quoted. Bars 7 are so constructed that upon the operation of a predetermined combination setting of the bars 7 in accordance with the operation of the magnets 5, one of the selector bars 8 is operated to close its individual contact 9 completing thereby a circuit to its individual selector magnet 285 of which each of these magnets is individual to an item to be quoted. As will appear more fully hereinafter, the item indicators are arranged in groups as diagrammatically illustrated in the present showing each comprising seven individual magnets 285. The purpose of this will be clear from the description to follow.

Each of the selector magnets 285 closes five individual contacts 288 to 292 which complete circuits through the conductors in cable 14 to an individual group of electromagnets 306 to 310. There are five such electromagnets in each group, one for each range of a stock quotation unit 16 of the stock board 17.

As shown in Figures 2 and 3, the stock board 17, although it may be of any size, in the preferred embodiment of my invention is shown as composed of vertically disposed sections, each of which has space for seven stock units 16 in a vertical column. Each stock unit 16 comprises five horizontal rows each horizontal row comprising four indicators, one indicator for indicating the hundreds value of the quotation, one for tens, one for units and the one at the extreme right for fractions. The top horizontal row may for example, represent the closing quotation of the previous day, the second horizontal row may represent the opening quotation of the day, the third the high, the fourth row the low and the fifth row the current quotation, although it will be understood that the above is merely described for purposes of illustration and any other arrangement of the ranges desired may be employed. All of the indicators for the same digit of the various ranges for the stock units in a vertical column are mounted on a single shaft. Thus, for example, the indicator for the tens unit for high, low, etc., of the seven items in one column are all connected to one shaft. The lower end of this shaft is geared to a unit at the base of each column comprising a permutation selecting device variably operated in accordance with received codes for controlling the vertical shaft.

Normally however, all of the indicators are latched against operation. Each electromagnet 306 to 310 when energized functions to release its indicators for operation by the vertical shafts 466 to 469, all of the remaining indicators on the same shafts for other stock items remaining latched against operation.

The extent of rotation of the shafts 466 to 469 which of course determines the indication set up on the indicators, is determined by the group of magnets 25 to 28, Figure 1. It will be noted that there are four such groups of magnets, one such group for each of the four vertical shafts described briefly above. The magnets 25 to 28 in a group control a selector, which as will be described in more detail hereinafter selectively determines the angular rotation of its individual shaft. Magnets 25 to 28 are connected over conductors in a cable 31 to armature contacts 32 of relays 33 and the circuit being completed over the armatures and conductors in the cable 34 to locking relays 374. These relays are connected over conductors in a cable 37 and through the connectors and conductors in the cable 39 to the armatures 372 of relays 371 which are selectively operated by impulses transmitted over conductors in the cable 43 by the receiving distributor 3 in accordance with the item quotation code combinations of impulses received following the first or item selecting codes received. The relay 343 controlling connectors 341 is controlled by a conductor in cable 43 and repeats the signal which operates relays 41 to also operate relays 36.

In addition to the selective operation of the selected indicators, it is also necessary to select for operation the particular indicators corresponding to the quotation which is being indicated. To this end the last code combinations of impulses received by the receiver 3 are received on range relays 356 to 360 which repeat the signals over conductors in the cable 39 and contacts 341 and 342 to operate relays 336 to 340. Relays 336 to 340 repeat these impulses over a cable 55 and through one of the circuits prepared by the relays 285 over cable 14 to one of the sets of the indicator magnets 306 to 310. Operating one of these magnets determines the range of the quotation of the selected item.

Following the operation of the selector magnets 25 to 28, one of the motor magnets 56 is selectively operated to close the circuit to its corresponding motor 61, each of which operates four vertical shafts 466 to 469, see Fig. 20. As briefly stated above, although the vertical shafts are thus rotated only released ones of the indicators rotate while the remainder remain latched against rotation, the energization of any magnets 306 to 310 of the sets of indicators 16 in the manner generally described above releasing particular indicators individual thereto for rotation by the shaft to an angle determined by the combination of the selector magnets 25 to 28 which have been energized.

Having described the operation and system briefly in connection with Fig. 1 attention will now be had to Figs. 6 to 9 inclusive which taken together illustrate completely the circuit and arrangement of the quotation board and the receiving station electrical equipment. A continuous tape 71, a fragment of which is illustrated in Fig. 5, has a plurality of perforations 71' which comprise transverse rows of five perforation positions indicated 72 to 76. As shown, a cycle or group comprises eight successive codes, one code in each cycle having a sixth perforation 77 which as will be described in the following, synchronizes the group of codes so that the transmitter and receiver not only are in synchronism but also in proper phase with respect to relative codes in a cycle. The tape 71 is also provided with a series of center or feed perforations 78 which cooperate with the teeth of a feed wheel for advancing the tape in a step by step fashion as will be described hereinafter. The codes transmitted by my system comprise preferably impulses of positive and negative polarity. The manner of supplying alternate polarities is shown in Figure 4 in which a battery 81 is tapped at the center 82 and grounded.

The tape 71, Figure 6, is conducted over guiding rollers 84 and 85 to a feed wheel 86 provided with the teeth 87 engaging the central perforations 78. The feed wheel 86 is mounted on a shaft 89 which also carries a ratchet wheel 91. A pawl 93 engaging the teeth of the ratchet wheel 91 is periodically operated in a step by step manner.

In operative relation with each of the perforating positions on the tape 71 is a feeler lever 101 mounted on a pin 102 and provided with a feeler pin 103 which is arranged to move into the perforations in the tape. The lever 101 is provided with an extension 102' and an insulated contacting member 103' which operates between the negative and positive sides of battery connected to the upper and lower contacts respectively. The lever 101 comprises an extension 104 to which is secured one end of a spring 105, the opposite end of which is secured to the frame in any well known manner, by action of which the feeler 101 normally tends to rock in a counterclockwise direction about the pin 102 urging its feeler 103 into the associated perforation in the tape 71. The lever 101, however, is normally held from this movement by one end of a lever member 106 pivoted at 106' and urged against the extension 104 by a spring 107 whose ends are secured to the lever 106 and to the frame work. The other end of lever 106 cooperates with an extension 108 of a lever member 109 pivoted at 110 and provided at one end with a cam follower 111 and at the other end with a lug 112 to which is secured one end of a spring 113, the opposite end of which is carried by the frame. Lever 106 is common to all of levers 101 and lever 109 is an operating lever for 106. By the action of the spring 113, the lever 106 is urged in a clockwise direction about its pivot 106' against the action of spring 107. Spring 107 has more tension than the total of all springs 105 and so holds all levers 101 in the position shown. In the normal stopping position of shaft 113' cam 112' holds lever 109 in its counterclockwise position, and so permits universal lever 106 under the action of spring 107 to hold all levers 101 out of engagement with the tape 71.

The follower 111 is in operative relation with a cam 112' carried on and fixedly rotating with the shaft 113'. Carried by and rotatable with shaft 113' is a disk 115 having a notch 116 which cooperates with the armature 117 of magnet 118. When the magnet 118 is deenergized, the armature 117 which is spring operated by a spring not shown moves to its outward position at which point the tooth extension of the armature engages the notch 116 and the shaft 113' is latched against rotation. Upon energization of the magnet 118, the armature 117 is withdrawn from the notch 116 and the shaft 113' is released for rotation.

The circuit of the magnet 118 is controlled over conductor 119 and two parallel circuits, one extending through the switch 120 to the lever arm 121 which is controlled by the tape 71 through roller 121' and the other extending over the conductor 122 to the armature 123 of relay 124. The energizing circuit for the relay 124 is controlled over the lever contactor 125 which is operated to engage its contact by the apex portion of the cam 112' and continues over the conductor 126 to the contact controlled by the extension 103' of the sixth lever 101. As shown, normally with no sixth perforation in the tape 71 and the lever 101 in the position shown, negative battery is connected to the right winding of the relay 124 and accordingly this relay cannot be energized. When, however, the lever 101 is operated by a perforation to close its lower contact, current from the positive side of battery flows through the relay 124 and this relay will be energized when contact 125 closes. The relay 124 comprises in addition to its right hand winding, a second winding which completes a locking circuit for itself over the armature 128 to the contactor 129 controlled by the cam 112'. In addition to the armatures already described, relay 124 also comprises armatures 131 and 132 which control the transmission of positive and negative impulses over the signaling line through the distributor 133 as will be described hereinafter.

The distributor 133 comprises a stop segment 134, a start segment 135 connected to armatures 131 and 132 respectively and five code segments 136 to 140 connected over conductors 141 to 145 to the five contactors 146 to 150 which are controlled by levers similar to the feeler lever 101 for operation between their upper and lower contacts.

Carried on the shaft 113' and rotating with respect to the distributor 133 is a brush 151. Brush 151 is provided with wipers 152 and 153 bridging the segments 134 to 140 with the solid ring 155. The solid ring 155 is connected over the conductor 156 to a remote receiving station about to be described. A motor (not shown) rotates the shaft 113' at a pretermined speed.

Having described the transmitter in general, the operation thereof will now be given. As stated when in operation a motor (not shown) tends to rotate the shaft 113' with its cam 112', disk 115 and distributor 133. The shaft, which is clutch connected (not shown) to the driving motor is, however, held from rotation by armature 117 when the latter engages the notch 116 of the disk 115. The tape 71 which has been perforated by a perforator of any well known construction in accordance with code combinations of impulses having a sixth perforation, is now fed into the position shown by the feed wheel 86.

At the starting position the cam 112' is in the position shown and in engagement with the follower 111 of the lever 109 holding the latter in its extreme outer position against the action of spring 113. The lever 106 under action of its spring 107 accordingly holds the feeler levers 101 (of which only one is shown for purposes of illustration) in their positions out of engagement with the tape.

In order to start operations, the operator will start the motor and close the switch 120. The start magnet 118 is now energized in multiple either through the switch 120 and lever 121 to ground or over conductor 122 to the back contact and armature 123 of the relay 124. The stop magnet 118 upon energization operates armature 117 against the action of its spring from engagement with the notch 116 and the shaft 113' is released for rotation as shown by the arrow. At this instant the brush 151 is on the segment 134 and the stop impulse transmitted is of positive polarity over the armature 131 in engagement with its back contact, segment 134, brush 151 and ring 155 and over conductor 156 to the remote station.

As the distributor rotates to the succeeding position engaging the start segment 135, current of negative polarity will be impressed over the back contact and armature 132, segment 135, the brush 151, ring 155 to conductor 156. By this time, cam 112' has moved beyond the extension 111 and the lever 109 by action of spring 113 is rocked in a clockwise direction about its pivot 110 in turn rocking the lever 106 clockwise about its pivot 106'. As the lever 106 is rocked clockwise, the feeler levers 101 are allowed to rock by actions of spring 105 about their shaft 102 in a counter-clockwise direction. The feeler levers 101 which are now in operative relation with perforations in the tape, will be permitted to move into these perforations and will rock their contactors 103 to engage their lower contacts. Those, however, which are not in operative relation with perforations will remain in the position shown inasmuch as they are stopped by the tape and their contactors 103 will continue to engage their upper contacts.

In this manner all of the levers 101 will be positioned in accordance with the perforations in the tape and the contactors 146 to 150 will be positioned to engage either their upper or lower contacts.

As the brush 151 now successively engages the segments 136 to 140 code combinations of impulses of positive and negative polarity will be transmitted over the signaling line 156. As the brush leaves the last code segment 140 and engages the first or stop segment 134, current of positive polarity will again be transmitted over the signaling line 156. As will appear hereinafter, this is the stop signal and functions to bring the receiving distributor to a stop. Until the start impulse is transmitted, the receiving distributor cannot be again started. In this manner the transmitting and receiving distributors are maintained in synchronism.

At this instant, also the cam 112 again engages the extension 111 which operates the lever 106 to again move all of the feeler levers 101 in a clockwise direction about their pivots 102 and out of the perforations in the tape 71. At this instant the tape is also stepped to the succeeding code position by a single step rotation of the feed wheel 86 and is well understood in the art.

The cycle of operation described above will now again be repeated as the distributor makes a second revolution. In this manner eight successive code combinations of impulses will be transmitted over the line 156. As has already been described in the present illustration of the invention, the first three of these codes will be item selecting code combinations of impulses and comprise five impulses each. The next four codes will comprise five impulses each and will select the numbers making up the quotation of the item and the last code will comprise five impulses and will select which of the range of the item is to be quoted; that is, whether it is closing, opening, high, low or current.

During the transmission of the first seven code combinations of impulses, the sixth feeler lever 101 remains in the position shown inasmuch as there are no sixth perforations as shown on the tape 71, Figure 5. Accordingly negative battery is continually connected to the relay 124 over conductor 126 and this relay remains deenergized even during the period while the cam 112' operates the lever 125 into engagement with its contact.

During the time, however, that the eighth code combination of impulses of a cycle is being transmitted, the sixth perforation 77 in the tape 71 permits its lever 101 to rock in a counter-clockwise direction and its contactor 103' engages its lower contact connecting positive battery to the right hand winding of relay 124. During the transmission of this code therefore; when cam 112' engages the lever 125, an energizing circuit is completed for the relay 124 from the positive side of battery over contactor 103', conductor 126, right hand winding of relay 124 and lever 125 to the negative side of battery. Relay 124 upon energization completes a locking circuit for itself from positive battery to the left hand winding, armature 128 and its front contact and contactor 129 to the negative side of battery. Armature 131 now disengages the positive side of battery at its back contact and engages the negative side of battery at its front contact, armature 132 disengages the negative side of battery at its back contact and engages the positive side of battery at its front contact and armature 123 opens one of the multiple circuits of start magnet 118.

If there is sufficient slack in the tape 71 so that the lever 121 continues to engage its contact, the movement of armature 123 from its back contact has no effect at this time. At the completion, however, of the transmission of this last code and upon the transmission of the first code of the new cycle instead of the transmission of an impulse of positive polarity over the line 156 for the stop impulse and the transmission of a negative impulse for the start impulse, the stop impulse will be an impulse of negative polarity, from armature 131 now engaging its front contact and the start impulse will be an impulse of positive polarity from the armature 132 engaging its front contact.

In this manner, the first code combination of a new cycle of eight codes is distinguished from all of the other code combinations by the reversing characteristic of the start and stop impulses. As will be described in the following this distinction at the receiving station maintains the transmitter and receiver not only in synchronism but in proper phase relation with respect to the arrangement of codes in a cycle.

If at any time during the transmission, the tape 71 becomes taut due to the fact that the codes have been transmitted faster than perforations are made on the tape, the lever 121 will open its contact opening one of the parallel circuits for the stop magnet 118. This magnet, however, will continue to remain energized over the armature 123 until the transmission of the eighth or last code of a cycle, at which time, as described above the relay 124 is energized opening the remaining circuit for the stop magnet 118 at armature 123. Magnet 118 now is deenergized and the armature 117 drops to its back position engaging the notch 116 of the disk 115. Transmission of the codes is accordingly stopped only at the end of a cycle of codes.

From the above, it will be clear that each cycle or code combinations of impulses transmitted over the line 156 comprises a predetermined number of codes during which time the tape is stepped from one set of perforations to the next and the feeler levers 101 successively engage each row of perforations for controlling the transmission of the codes over the distributor 133. The start and stop impulses during the transmission of all but the first of these codes comprises a positive and negative impulse respectively. The start and stop impulse for the first code combination of any group or cycle comprises negative and positive impulse respectively. The distributor, while of the start stop type for controlling the transmission of start and stop impulses for each rotation thereof, can be brought to a stop at the transmitting end only at the completion of a cycle of codes and similarly the receiver distributor is also controlled to a stop position as will now be described.

The conductor 156 extends to a remote receiving relay 171 located at a receiving station, as indicated in Figure 7. The receiving relay, which is of a polar type of any well known construction, comprises an armature 172 operating between positive and negative polarity contacts and connected to a conductor 173 which extends to a stop magnet 174, the circuit for which extends through the lever controlled contact 175, conductor 176 to the armature 177 of a relay 178. Stop magnet 174 controls an armature which engages a notch in a disk on the distributor shaft as shown in Figure 6 in connection with magnet 118.

As will be described hereinafter the relay 178 is energized only at the start of each cycle and accordingly negative polarity from the armature 177 is impressed upon the conductor 176 at that time. The stop magnet 174 can therefore only be energized by a positive start impulse operating relay 171 to move armature 172 to its left hand contact for the first code combination of a cycle of impulses. During the transmission of the remaining codes in the cycle, the relay 178 is deenergized and accordingly impresses positive polarity from armature 177 on the conductor 176 and the magnet 174 can thereafter be energized only when the received start impulse is of negative polarity. It will also be noted that the circuit for the magnet 174 is controlled by the lever controlled contactor 175 which opens its contact immediately after the transmission of the first start impulse as will now be described.

The conductor 175 is controlled by a cam disk 181 carried on a shaft 182 which also carries a distributor 183. Distributor 183 comprises a solid ring 184 which is connected in multiple with the start magnet 174 by the conductor 173. After the transmission of the start impulse as described above, code combinations of impulses received by the line polar relay 171 are repeated over the armature 172, conductor 173 to the solid ring 184.

The distributor 183 also comprises a stop segment 185, a start segment 186 and five code selecting segments 187 to 191 which are bridged with the solid ring 184 by the brush 192. The segments 187 to 191 are connected over conductors 195 to 199 respectively to the solid rings 201 to 205 respectively. The rings 201 to 205 are wiped over by brushes 206 to 210 connected over conductors 211 to 215 respectively to the brushes 216 to 220. The brushes 216 to 220 wipe over rings 221 to 225 respectively. The segments on rings 221 to 225 distribute the successive codes of a cycle received to their proper receivers. The brushes 206 to 210 and brushes 216 to 220 are mounted on a rotating brush carrier (not shown) which also carries brushes 231 to 237 of the segmented rings 238 to 244. As will be described in detail hereinafter, the segmented rings 238 to 244 control the cycle of operations following the receipt of the code cycle. The brush carrier is geared to the same drive motor (not shown) which rotates distributor 183 and is rotated at a fraction of the speed of the distributor brush 192 on the distributor 183 so that the brushes 216 to 220 will wipe over the first or topmost segments on rings 221 to 225 while the distributor brush 192 makes one complete revolution, and the brushes 216 to 220 will wipe over the second set of segments just below the topmost set of segments on rings 221 to 225 while the distributor is making the second revolution and so on.

When the tape is placed in the sender, the feeler lever 101 will be pressed down to close its contact to negative. When the main power switch is now closed and the manual starting key 120 is opened, the relay 124 will be deenergized and a starting circuit will be closed through start magnet 118 and back contact of armature 123 of relay 124. This will continue until the tape is stepped successively to bring a channel finding perforation to register with the channel feeler 101 whereupon the feeler 101 will rise and connect its contact to positive. This will prepare a circuit over conductor 126 and when cam 112' closes contact 125, a circuit will be completed through relay 124 and contact 125 to negative. Relay 124 will operate and form a holding circuit through contact 128, at the same time breaking the circuit of start magnet 118.

The sending system will stop in position to send next, the first group signal of the ensuing stock quotation unit of intelligence. The relay 124 when operated connects negative potential to the stop segment 134 of the distributor 133 which operates line relay 171 at the receiving station and causes that relay to connect negative potential to its armature. Should the pilot distributor at the receiver at this time have its brushes in normal position as shown, the channel finding relay 178 will be energized by a circuit through the relay winding and the segment 238. This will connect negative to both terminals of the start magnet 174 and the start magnet will not be operated. However, should the brushes of the distributor be other than normal, the relay 178 will connect positive to start magnet 174 and the relay 171 will connect negative current to start magnet 174 so that start magnet 174 will start the master distributor 183 repeatedly until the brushes of the pilot distributor are in normal position. The distributor 183 is geared to the pilot distributor in a ratio of eight to one so that distributor 183 makes a revolution for each group signal and the pilot distributor makes a revolution for each complete stock quotation of eight group signals. Thus, by the automatic functioning of the device, as shown, both sending and receiving stations have attained a readiness to send and receive the first group signal of a quotation unit. The manual starting key 120 now is closed and normal transmission ensues.

From the above, it will now be clear in connection with Figure 1, that code combinations of impulses are generated at the transmitting station 1, comprising codes for selecting an item to be quoted followed by codes which give the quotation of the item and a code indicating the range of the item quoted. These impulses are transmitted from the transmitter 1 over the line 156 through the receiving distributor 3. The first or item selecting codes are then repeated by the distributor 3 over the cable 4 to operate relays 5 which in turn select one of the relays 285 for energization. These relays upon energization prepare a circuit for one of the index magnets of a particular item so that when the code which is to follow is finally received, the indicator individual to the magnet is released for operation in accordance with the code. The distributor 3 next distributes the codes received in accordance with the quotation of the item selected over the conductor through cable 43 to operate relays which in turn repeat the impulse through conductors in cable 39 and the conductors in the cable 37 to the relays 336 to 340. The relays 336 to 340 upon energization then repeat these impulses again over the conductors in cable 34 to the selecting magnets 25 to 28. The selecting magnets 25 to 28 in turn variably condition a selector shaft for a predetermined angular rotation. Four such groups of impulses, each group comprising five impulses are received through only four impulses are effective. The first group for hundreds quotation, the next for tens, units and fractions as indicated by the four groups of magnets 25 to 28. The next group of impulses received are repeated by the distributor 3 through conductors in cable 43 to relays 356 to 360 which in turn repeat these impulses to conductors in cable 39 and contactors 342 and conductors in cable 37 to the relays 374. These impulses in the relays 374 are then repeated over conductors in the cable 55 and through the prepared circuit by the relay 285 to energize one of the range magnets which, as stated above, releases this particular indicator, the indicator now being rotated in accordance with the energization of the selector magnets 25 to 28. In proper timed relation the connector relays such as 343 and 33 are energized for repeating the impulses to their respective relays. Similarly the circuit controlling magnets 56 to 59 are also energized at a proper interval, as will be explained in more detail hereinafter in connection with the specific circuit.

The first set of segments on rings 221 to 225 are connected to conductors 251 to 255. The next two sets of segments are connected to similar conductors 256 and 257. While the brushes 216 to 220 are wiping over the first segments of the five rings, the first code of five impulses is received. While the brushes 216 to 220 are moving over the second set of segments connected to conductors 256, the second code is received and while the brushes are wiping over the third set of segments connected to conductors 257, the third code is received. These three codes constitute the item selecting codes. The rings on the next four positions are provided with only four segments each on rings 221 to 224, ring 225 having no segments on these positions. The first of these sets of segments are connected to conductors 261 to 264, the next set of segments are connected over similar conductors 265, the next set to conductors 266 and the last set to conductors 267. While the brushes are wiping over these segments, the codes received comprise only four impulses each as described above for making the numeral and fraction selection of the quotation of the item being quoted. During the period while the brushes 216 to 220 are wiping over the last set of segments connected to conductors 271 to 275, the range of the quotation is received.

The conductors 251 to 257 are connected to the selector magnets 5, Figure 8. Fifteen such selector magnets are provided connected to the conductors 251 to 255 and conductors 256 to 257. These magnets 5 are operated in accordance with the first three received combinations of impulses to in turn operate individual code bars 7.

Positioned above and transversely of the code bars are selector bars 8 each of which controls an individual circuit to a selector circuit magnet such as 285 each of which controls a set of contactors 286 to 292. The contactor 286 provides a locking circuit for the electromagnet 285 over the conductor 293 extending to the ring 240 which is bridged by the brushes 233 and 237 with the ring 244 to negative battery so that if while the brush 233 is on the ring 240; magnet 285 is energized, a locking circuit therefor is completed and the magnet held energized during the remainder of the cycle or until brush 233 encounters the break or open portion of ring 240.

Contact 287 extends positive battery from the conductor 294 over the conductor 295 to the relay 33 which upon energization closes the contacts 32 for preparing circuits for the group of selector magnets 25 to 28 and the adjacent three groups of selector magnets for the column of seven indicators 305 as described briefly in connection with Figure 1, the detail of which will be described hereinafter. As will be described in more detail hereinafter these electromagnets, operated in accordance with the received codes after a selection of the item to be quoted variably operate the indicators in the selected items.

The indicators in the set are at this time all normally latched against operation, but are selectively released by the electromagnets 306 to 310, Figure 9, the magnets 306 to 310 being individual to each range of a set of indicators for one item. As will be described, after a selection of one of the indicators, one or more of the magnets such as 306 to 310 of a set of indicators is energized depending upon the range of the item to be quoted for releasing its individual indicators. The magnets 306 to 310 are connected over the conductors 316 to 320 to the contactors 288 to 292 respectively, which in turn extend the circuits therefor over the conductors 325 to 329 to the front contacts of armatures 331 to 335 of the locking relays 336 to 340. The energizing circuits of relays 336 to 340 are completed over the extension of conductors 325 to 329 connected to the front contacts 341 of the armatures 342, controlled by a relay 343. The circuit for relay 343 extends over the conductor 344 to the segment 241. When the brush 234 is wiping over the segment 241 after the starting of the cycle as illustrated in the above, negative potential from the ring 244 to brushes 237 and 234 is impressed on the conductor 344 to energize the relay 343 closing the armatures 342 over their front contacts 341 and extending the circuits from the armatures 351 to 355 of the relays 356 to 360 to relays 336 to 340. The circuits for relays 356 to 360 are in turn completed over conductors 271 to 275 to the last segments on the segmented rings 221 to 225.

As will be described, on receipt of the last code, which is referred to as the range code, an impulse is transmitted over one of the last segments of the segmented rings 221 to 225 and over one of the conductors 271 to 275 to energize one of the relays 356 to 360. This relay upon energization completes a locking circuit for itself from positive side of battery through any one of the relays energized and the front contact and its armature and over the conductor 361 to the armature 362 of the relay 363. The relay 363 in turn is controlled over the conductor 364 and the segment 242. When the brush 235 is wiping over this segment negative polarity is impressed on the conductor 364 from the ring 244 to brushes 237 and 235. Negative polarity for the locking relays 356 to 360 extends over conductors 361 and over one of the armatures 351 to 355 through the winding of the energized relay to positive battery. A further circuit is completed over armatures 342 and their contacts 341 for energizing one of the relays 336 to 340 which upon energization is locked over its front contact and armature, and the armature 365 of the relay 366. The relay 366, it will be noted, is connected over conductor 293 and is energized when negative polarity is impressed on this conductor over ring 240, as described above.

The sets of conductors 265, 266 and 267 are each connected to individual selector magnets 371. Although only five such magnets are shown, it will be understood that there are in the present illustration a total of sixteen, one for each of the sixteen conductors 261 to 267 as described above. Each of these relays controls its individual armature 372 over which a locking circuit for the associated relays is completed and over which negative potential from the armature 362 extends to its individual conductor 373 extending over the armatures 342 and contacts 341 to the relays 374.

Relays 374 upon being energized are locked over their individual armatures 375 and also extend negative potential to the conductors 376 to 391. The conductors 376 to 391 extend over the contacts 32 to the selector relays 25 to 28 and adjacent groups of selector relays which control the selector discs 475.

Each indicator unit 16 is provided with an individual motor such as 61, the circuit for which is controlled by an individual double wound relay 56. One winding of relay 56 is connected over the conductor 398 to the distributor segment 239 and negative polarity is impressed on this conductor from the ring 244 when the brush 232 is wiping over the segment 239 during the transmission of the codes for making the item selection. The opposite terminal of this winding of relay 56 is connected over conductor 399 to the common return line of certain ones of the selector bars 8 and is energized in series with a selector magnet 285 when the circuit therefor is completed by the closing of a contact of a selector bar. It will be noted, however, that the relays 285 are marginal so that while the closure of a selector contact 9 does initiate the performance of its corresponding operating motor 61 the current flowing at that instant is not sufficient to affect the relays 285 since brush 232 has not yet contacted segment 239 so that the sole negative connection is made through resistance 40k, Fig. 9. In this manner a relay 56 is first energized when any item of the seven in its vertical column units is selected before the circuit for its associated relay 33 is energized for conditioning the indicators for rotation as will be described in detail hereinafter.

Having described the circuit arrangements of the receiving apparatus, the detail method of operation will now be described to be followed by a detailed description of the apparatus employed. With the apparatus in the position shown at the beginning of the transmission of the first code of the first cycle, an energizing circuit is completed for the relay 178 from positive potential through the winding of relay 178, segment 238 and brushes 231 and 237 to the negative side of battery. With the relay 178 energized, armature 177 is in engagement with its front contact and negative current flows over the conductor 176, through the contact 175 and stop magnet 174, conductor 173 to the armature 172, it being understood that the distributor shaft 182 is in the position shown at the beginning of the first impulse of the first cycle. If at this instant, a start impulse of positive polarity, as described above, is received over the signaling line 156 by the polar receiving relay 171, the armature 172 will engage its left hand contact and the circuit for the stop magnet 174 will thereupon be completed energizing this magnet which in turn removes its armature from engagement with a notched disc (not shown) and releases the distributor for rotation by a motor (not shown) in frictional engagement with the distributor shaft 182. Upon the first movement of the distributor shaft 182, the disk 181 carried thereon rotates a sufficient distance to open the contact 175 and the start magnet 174 is deenergized and is not operated thereafter in response to further impulses. Although magnet 174 is deenergized, the stop notch has rotated past the armature of the magnet and accordingly the magnet has no effect at this time.

The brush 192 will now rotate to the first signaling segment 187 in synchronism with the rotation of the brush 151 at the transmitting station moving to the first impulsing segment 136.

At this instant an impulse will be impressed on the conductor 156, the polarity of which is determined by the first perforation in the tape with which the feeler 103 of the first feeler lever 101 is in operative relation. This impulse will energize the polar receiving relay 171 operating its armature 172 to engage either its left or right hand side contact and current of positive or negative polarity depending upon whether or not the tape was perforated at the first position for transmitting a marking or spacing impulse, will flow over the conductor 173 through the distributor ring 184, brush 192, segment 187 and over the conductor 195, ring 201, brush 206 over the conductor 211, brush 216 and over conductor 251 to the first selector magnet 5 to negative battery.

If the impulse, as stated above, is a marking impulse and armature 172 engages its left hand contact, the first selector magnet 5 will be energized. If it is a spacing impulse, the magnet 5 will not be energized.

Similarly when the brush 192 wipes over the second segment 188, current is transmitted from the armature 172 depending upon the polarity of the second impulse received and over the brushes 207 and 217 and conductor 252 to the second selector magnet 5, the energization of the second selector magnet depending upon the character of the second impulse received in the code. In this manner, as the brushes 216 to 220 are moving over the first segments of the segmented rings 221 to 225 five impulses are received, the distributor brush 192 as explained above, making a complete revolution during this period. In this manner, the combination of impulses is repeated over the armature 172 to the first five selector magnets 5.

By this time the brush 231 has moved away from the first segment of the ring 238 and accordingly the relay 178 is deenergized. As explained above, the start impulse transmitted when the brush 151 is in engagement with the start segment 135 for the second code of a cycle of codes is a negative impulse from the armature 132 when in engagement with its back contact and accordingly the armature 172 of receiving relay 171 will be in engagement with its right hand contact. Inasmuch as armature 177 is in engagement with its back contact, relay 178 being deenergized, when at the start of the second code of the cycle, the brush 192 is in engagement with segment 186 and the contactor as described above closes its contact, an energizing circuit is completed for the relay 174 from the positive side of battery, back contact and armature 177, conductor 176, contactor 175, winding of start magnet 174, conductor 173 and armature 172 and its right hand contact to the negative side of battery. The distributor shaft 182 will accordingly again be released for the second rotation by energization of start magnet 174.

It will be understood that the receiving distributor 183 rotates at a slightly faster speed than the transmitting distributor so that it returns to its normal stop position before the transmitting distributor and is in readiness for the start impulse when it is received. In this manner, the two distributors are maintained in synchronism during each cycle.

Following the receipt of the second code combination of impulses, a third code is received, the operation being exactly the same as that recited in connection with the second code except that during this period the brushes 216 to 220 are wiping over the third set of segments on the segmented rings 221 to 225 and the impulses are repeated over the conductors 257 to the third or last five selector magnets 5, it being understood that here the start and stop impulses are now the same as those described for the second combination. Following the receipt of the third code combination of impulses or the third revolution of the distributor 183, all of the fifteen selector magnets 5 will have responded to individual impulses of the codes to in turn operate their code bars 7.

At this time the brush 236 starts to wipe over the segment 243 and the start magnet 284 is energized over a circuit including conductor 285" to the segment 243, brushes 236 and 237 and ring 244 to the negative battery. The energization of magnet 284 operates its armature to release the motor shaft of the selector bars for rotation to operate the bar 8 which has been selected as will be described in more detail hereinafter.

The energization of the selector magnets 5 now completes a selecting circuit by operating one of the bars 8 closing its individual contact for one of the magnets 285 depending upon which of these bars is operated. Assuming that bar 8 to the extreme left closes its contact, the circuit for the topmost electromagnet 285 is closed from positive battery through the electromagnet 285 over the extreme left hand contact controlled by the extreme left hand bar 8 over conductor 399, winding of relay 56, conductor 398 and resistor 401, Figure 9, to negative battery. The left hand winding of relay 56 is at this time energized closing the circuit for the motor 61 to start the indicator shafts in rotation, but the relay 285 being marginal is not operated at this time due to the small current which will flow through resistance 401. The relay 285 has however, now been selected for later operation as will be described.

The fourth, fifth, sixth and seventh codes will now be successively received as the brushes 216 to 219 wipe over the fourth, fifth, sixth and seventh segments of the segmented rings 221 to 224. As described above, the codes for these particular channels comprise only four impulses in order to make the necessary selection of the numerals which comprise the quotation to be made. As the brush 192 rotates over the first four segments 187 to 190, code combinations of received impulses will be repeated over the conductors 261 to 264 while the brushes 216 to 219 are moving over the fourth segments of rings 221 to 224. The next code will be repeated over the conductors 265 while the brushes 216 to 219 are moving over the fifth segments, the succeeding code over conductors 266 while the brushes 216 to 219 are moving over the sixth segments and the last of these codes will be repeated over the conductors 267 while the brushes are moving over the seventh segments. The circuits completed over these conductors will now selectively operate the relays 371. At this time the relay 363 is also energized over a circuit from positive battery through the relay 363, conductor 364, segment 242, brushes 235 and 237 and ring 244 to negative side of battery so that upon energization of any of relays 371, locking circuits therefore are completed from positive battery through these relays 371 their front contacts and armatures 372, conductor 361 and armature 362 and its front contact to negative battery.

Following the reception of the seventh code, the brushes 216 to 220 will wipe over the last set of segments on the segmented rings 221 to 225 during which the range selecting code is received as explained above. This code is repeated over one or more of conductors 271 to 275, energizing corresponding ones of the relays 356 to 360. Each of these relays thus energized in turn locks itself over its own armatures 351 to 365, conductor 361, armature 362 and its front contact.

The above constitutes a complete cycle of operation. The item selecting codes have been received and distributed to the item selectors which have been conditioned for later operation. Similarly the quotation and range codes have been received and distributed to the proper selecting apparatus. No actual operation, however, of selected item to indicate the quotation is made during the cycle while the codes therefor are received.

As will appear in the following the actual operation in accordance with the codes received and recorded are now carried out while the codes for the succeeding selection are being received. Accordingly a full overlap is provided, the full line period being used for signaling, while at the same time, this same complete code interval is available for the actual operations.

The brushes 231 to 237 are at this time back to the position shown and brush 231 is wiping over segment 238 completing an energizing circuit for relay 178. Unless the start impulse for the first code of the received cycle is now again a positive impulse, the start magnet will not be energized.

Assuming a start impulse of the correct polarity, magnet 174 is energized and the distributor released for the first code of the second cycle. Thereafter operations as described in the above for the first cycle are repeated.

The selecting conditions set up during the preceeding cycle now become effective as follows.

Shortly after brush 231 leaves its segment 238 which it may do only in response to a start pulse of the proper polarity, brush 233 rides off of segment 240 opening the locking circuit which has been holding the previously operated relay 28 as described above and which includes wire 29 and locking contacts 286. Locking relay 366 is also opened at this time since it too derives its negative polarity over line 293 and the same segment 240, thereby releasing the armatures of all of the secondary relays 336 to 374 at the same instant that the armatures of operated relays 285 are released.

After this has been done brushes 232, 233 and 234 simultaneously encounter their respective segments 239, 240 and 241. In so doing brush 232 introduces direct negative polarity to line 298 thereby shunting out resistor 401 so that the increased current upon this line which also includes line 399 will now cause to be operated the marginal relays 285 preparing the circuits 316 to 320 over which the range signals are sent to their respective magnets 306 to 310. Brush 233 encountering its segment 240 prepares the locking circuit for relay 285 and relay 366 again. As to relay 366 the circuit is complete and that relay is energized and its armature attracted but as to the relays 285 the completion of their circuit awaits the energization of any one of them after which the presently described circuit maintains it in energized condition.

When brush 234 is wiping over segment 241, relay 343 is energized over a circuit including its winding, conductor 344 to the segment ring 241, brushes 234 and 237 and ring 244 to negative side of battery. Upon energization, relay 343 closes all of the armatures 342 over their front contacts and energizing circuits are completed for the relays 336 to 340 and relays 374 in accordance with the settings of relays 356 to 360 and the relays 371. The relays 336 to 340 and 374 are then locked in accordance with the settings as transferred from their corresponding relays 356 to 360 and 371 by reason of the energization of locking relay 366.

As relay 285 is energized and closes its contacts 286 to 292, relay 285 is locked over the contact 286, conductor 293 to the segmented ring 240. As a result of the closing of contact 287 an energizing circuit is completed for the transfer control relay 33 from negative through the winding of relay 33 and over conductor 295 second contact 287 to the positive battery conductor 294. Energization of the relay 33 now completes the final energizing circuits selectively for the selector magnets such as 25 to 28 which are now variably operated in accordance with the energization of the fifteen relays 374 to determine the extent of rotation of the released indicators, the circuits therefor extending from negative battery, front contact and armature 365 of relay 366, front contacts and armatures 375 of energized relays 374, over conductors 376 to 391 and contactors 32 to the magnets 25 to 26, etc. Circuits are also extended from negative battery and armature 365 over conductors 325 to 329 in accordance with the relays 336 to 340 which are energized and through contacts 288 to 292 to magnets 306 to 310 in accordance with the range code received. The range magnet 306 to 310 which is energized releases its indicators for rotation through an angle determined by the magnets 25 to 28 which have been energized.

It will be noted that relay 343 remains energized only long enough to permit transfer of setting of the first set of relays 356 to 371 to relays 336 to 340 and relays 374. The brush 234 thereafter moves off segment 241 opening the circuit for relay 343. It will also be noted that simultaneously brush 235 moves off the upper segment on ring 242, opening the circuit of locking relay 363. Relay 363 deenergizes opening the locking circuits for relays 356 to 371 and these are reconditioned for the succeeding code received shortly thereafter. Relays 336 to 340 and relays 374 remain energized during this period and continue so in fact into the next cycle when brush 233 moves from the upper segment opening the circuit of relay 366 and locking circuit of relay 285. Relay 366 upon deenergization opens the circuits of relays 336 to 340 and 374 preparing these relays for the transfer operation from relays 356 to 360 and 371 which have been just energized in accordance with a newly received code.

As brushes 234 and 235 ride off of their respective segments, brush 232 also leaves its segment 239 its objective being continued by the locking circuit which includes line 293 and segment 240. In other words the introduction of direct negative current so as to afford sufficient power to operate the marginal relays 285 once having been brought about by the engagement of brush 232 and segment 239 over line 398 this engagement may thereafter be broken since brush 233 and its segment 240 serve to maintain the locking circuit 293 which through contacts 286 hold the energized relays 285 in locked condition as well as supplying current to the other relay 366 which is connected to the same circuit.

In order to assure that the individual motors 61 shall continue to operate a sufficient length of time after the particular selector contact 9 has been opened which event occurs at the same time that a subsequent and new selection is made, the motor operating relay 56 is equipped with a conventional double winding one of which is energized at the closure of a particular contact 9 and the other of which is energized subsequently when relay 285 is operated. The latter energization is effected through a closure of contact 287 with positive current source over line 294 and includes in series line 295 resistor 295' and line 56'.

It will be recalled that during the first cycle described above the selecting codes received were such that the left bar 8 closed its contact by operations of the motor when released by magnet 284. Magnet 284 was energized when brush 236 wiped over segment 243. At this time brush 232 also wiped over the last portion of segment 239 which shunts the resistance 401. But the motor as will be described operates through a clutch and does not complete its operation of closing the contact of bar 8 before brush 232 leaves segment 239. Accordingly when the contact of bar 8 was closed during the first cycle, relay 285 was not energized as described above.

During the succeeding cycle, however, when brush 232 wiped over segment 239 shunting resistance 401, relay 285' was energized and the previously conditioned operations were completed as described. During this second cycle also a new item selecting code was received so that when immediately after the code as magnet 284 was energized, the motor started into operation, the previous selection was restored and the contact of a new bar 8 was closed. Its associated selector relay 285 was not energized at this time for the reason explained in the above. The energized relay 285 remained energized although a new bar selection was made due to its locking circuit.

When, however, during the third cycle brush 233 moves off the upper segment of ring 240, momentarily opening the circuit over conductor 293, the locking circuit for the locked selector magnet 285 is opened and this relay is deenergized.

Immediately after brush 232 engages segment 239 to shunt resistance 401 to energize the selecting relay associated with the bar operated by the second received code, brush 233 engages the lower segment on ring 240 to close the locking circuit for this selector relay and brush 234 wipes over segment 241 to energize relay 343 to transfer the settings of the relays 356 to 360 and relays 371.

Having described the circuits employed in carrying out my invention, I shall now describe the preferred embodiments of the mechanism employed in connection with my circuit. The stock board itself comprises a unit for each stock item to be quoted. Each unit has a suitable number of drums to indicate the price of the stock including such indexes as the current, high, low, opening and closing or any other characteristics desired. For each index of each unit, there are a number of indicator drums one for fractions, units, tens and hundredths each or higher if desired.

A number of such units, each representing a different stock are arranged in a vertical column. At the foot of each column, a common selecting mechanism is provided which operates in accordance with the quotation codes received to determine the angular rotation of the selected drums in the vertical column. As many columns may be provided as will be necessary for the number of stocks to be listed on the board.

The price setting units, see Figures 15 to 21 inclusive, comprise a motor 61, Figure 20, which comprises a rotating armature shaft 461 suitably mounted in bearings (not shown) carrying on its end a worm gear 462 meshing with gear 463 which is carried on and rotates a cross shaft 464. Cross shaft 464 carries an individual gear 465 for each of four vertical shafts 466 to 469. Each gear 465 meshes with a gear 471 mounted on the corresponding vertical shaft and adapted to drive it through a friction disk 472. Friction disk 472 comprises plates 473 between which the friction material is carried and which is urged against the gear by a spring 474.

Concentric with each of the vertical shafts 466 to 469 is a series of four loosely mounted spaced notched code disks 475 carried between guide plates 476 and 477 and separated by separators 477' carried on a shaft engaging thimble 477''. Each of the disks 475 is adapted to occupy one or the other of two positions to which it is moved by means of individual bell cranks 478, Figure 15. The bell cranks 478 are pivotally mounted at 479 and are pivotally secured at their opposite ends 480 to the slides 481 which are pivotally connected at 482 to the armatures 493 to magnets 25. Connected to a projection 484 on each slide 481 is one end of a spring 485', the other end of which is secured to the frame in any well known manner. These springs 485' are opposed to the action of the magnets 25 and tend to restore the slides 481 and their associated disks 475.

When the magnet 25 energizes, the armature 483 is moved upwardly attracted by the magnet and in turn moves the slide bar 481 upwardly rocking the bell crank 478 about its pivot 479 in a clockwise direction which in turn rocks the disks 475 in a counterclockwise direction. As will be understood a magnet 25 and slide bar 481 is provided for each of the disks 475 and a corresponding system of bell cranks and slides is provided for each of the other shafts 505.

Arranged circumferentially around the notched disks is a series of spring pressed rods 486 carried in notches in the end plates 476 and 477 and guide plate 487 and held in position by the action of springs 488 the guide plate 487 being maintained in spaced relation to plate 477 by a tubular member 487' and rods 487''. The rods 486 each carry a set of rollers 489 arranged opposite notches in the disks. The notches in the disks are so arranged that for every combination of setting of the disks, a notch in each of the disks is in alignment with the notches in all of the other disks and the particular rod 486 which is opposite these aligned notches will drop in the aligned notches in the disk. These notches are also arranged so that when the disks are reoperated in accordance to the new code combination of impulses, the particular rod which has previously dropped into the notches is cammed out and held on the outer circumferential edge of the disks. As a result of the new alignment of the disks, the rod 486 opposite the new aligned notches drops into the notches.

Carried on the drive shaft 466 is a stop arm 491, Figure 18 which rotates with the main shaft. As the arm 491 rotates, it moves past the rods 486 on the outer surface of the disks which are just outside the path of the arm 491 which accordingly has unobstructed path of rotation. When, however, an alignment of notches occurs and one of the rods 486 drops into the aligned notches, its end shown in Figure 18 moves into the path of the arm 491 and brings the shaft 466 to a stop at this position. In this manner, the angular rotation of the shaft is selectively determined in accordance with the operation of disk members 475 which in turn are selectively operated by the associated selector magnets 25 to 28 which, as described above, are in turn energized selectively in accordance with the received code combinations of impulses for indicating the amount of the quotation. Although a preferred form of selector mechanism is here shown, any other well known type may if preferred be used.

The shaft 466 carries on its end a gear 501 secured to rotate therewith by means of a set screw 502 engaged in hub 503 of gear 501. The gear 501 meshes with gear 504, secured on the end of the shaft 505 by a screw 506 engaged in hub 507 of gear 504. The shaft 505 extends the entire height of the vertical section of the board and is provided with a gear 511 for each stock unit, the gear 511 being secured to the shaft 505 through a screw in the hub 512 and meshing with gear 513 which is individual to the stock unit including the indicators 514 to 518 all carried on and rotatable with the shaft 519 rotatable in bearings 520 and 521 on the frame 522. It will be noted that opposite each of the indicators there is provided a slot 523 through which the numbers on the indicators are visible, each indicator being provided with a complete set of the ten digits from 1 to 0. It will be noted that five such indicators are carried on the shaft 519 one for each of the five ranges; namely, last, opening, closing, high and low. A similar set of indicators controlled by a similar selecting arrangement is provided for each digit in a quotation and accordingly there are four such sets as shown in Figure 20. Although a preferred form of indicator is here shown, it will be understood that any other of the well known character wheels may if preferred, be used.

The drums of the indicators 514 to 518 are not rigidly attached to the vertical shaft 519 but have a tendency to rotate therewith due to the drag of a spring. As shown in Figure 19, each of these indicators comprises an outer drum 525 and an inner drum 526 rotatably supported on the shaft 519 by means of a shouldered collar 527. The collar 527 is rotatably mounted on a sleeve 531 adjacent one end thereof with one end of collar 527 engaging a shoulder 532 on sleeve 531. The end of the sleeve 531 is threaded for receiving a nut 533 for holding collar 527 in position on sleeve 531. The sleeve is also provided with a set screw 534 for securing it for rotation with the shaft 519. Secured to the sleeve 531 by screws 535 is the inner end of a helical clockspring 536. The outer end of the spring 536 is secured to one end of a yieldable shoe 539 which presses against the inner surface of the smaller drum 526 which as stated above, is in turn attached to the large indicator drum 525. Spring 536, as shown in Figure 16, is of a special construction, the inner spring part being made of very thin material while the outer shoe section 539 is made of considerably heavier material. By this construction the heavier portion 539 forms a friction shoe against the inner surface of the drum 526 while the thinner spring part provides the necessary tension. As will be explained hereinafter the spring is tensioned when the shaft 519 is rotated to in turn cause the outer section 539 of the spring to slip on the inner surface of the drum or to drag it around by friction.

Attached to each of the collars 527 and spaced from the drum 525 by the spacer 541 is a ratchet wheel 542, Figure 19. Each of the ratchet wheels 542 is provided with eleven teeth 543 corresponding to each of the numerals on the drum and an extra tooth. In operative relation with the teeth on each of these drums is a locking lever 544, Figure 15, rigidly attached at 545 to a slide bar 546. This slide bar extends across the four indicators of one index of a stock item. A slide bar 546 is provided for each of the horizontal rows of drums corresponding to each index such as high, low, etc.

The slide bar 546 is normally held in its right position by action of spring 547, one end of which is secured to a projection of the slide bar and the other to the frame work. In this position, a lever 544 engages a tooth in the ratchet wheel of the four drums in a horizontal row which are thereby prevented from rotating even though their individual shafts rotate and tension the springs 536 to produce a drag on each of the drums.

Carried on each of the slide bars 546 is a pin 551 which is in operative relation with the bifurcated end of an armature extension 552 of the armature 553 pivoted at 554 on the frame work 555 of the electromagnet 306 to 315. The electromagnet 306 to 315, as described in the above, is an index magnet and when energized rocks its armature 553 about its pivot 554 and through the pin 551 moves the slide bar 546 to the left against the action of the spring 547 removing the extensions of levers 554 from engagement with the teeth on the disks 542 and releasing the drums for rotation.

It will be understood that there is such a magnet corresponding to each characteristic of each of the stock quotations such as high, low, current, etc. The manner in which energization of these magnets is selected has already been explained in connection with the electrical circuits.

The several indicator dials are moved into position to express a new quotation in the following manner. Referring particularly to Figs. 15, 16, 17a and 20 it will be remembered that upon the determination of a particular vertical section in which the stock to be recorded happens to be located a contact 9 in the stock selector is closed and the motor 61 corresponding to that section, is started to operate inducing clockwise rotation to the friction driving gears 471. The shafts 466 to 469 are withheld from being rotated by their gears 471 through the interposition of one or another of the selector rods 486 into the path of revolution of its stop arm 491 in accordance with a previous setting, but as soon as the new price signals are communicated to the sixteen magnets 25 to 28 they are caused to actuate their armature to in turn set up a new selection and allow a new selector rod 486 to drop into the path of the stop arm 491 concurrently restoring the previous rod 486.

Instantly as this occurs the stop arms 491 and their shafts 466 to 469 will yield to the influence of their driving gears 471 and each will rotate until its stop arm 491 shall find another rod 486 in its path whereupon it will again be stopped. The new positionment of the several shafts 466 to 469 is communicated to their corresponding shafts 419 through the medium of the vertical shafts 505 and the gearing therewith as already described. Thus the shafts 519 assume the same position as the selector shafts 466 to 469 at all times.

Since the movement of the shafts 519 is always in the same direction (clockwise as viewed in Fig. 16) they tend to wind their several coil springs 536 about themselves. The amount of winding that each spring 536 may receive is limited by slippage between the shoe 539 to which the outer end of each spring is attached and the casing 526 which houses the spring. In all cases, however, the springs are capable of receiving considerably in excess of one complete revolution before the force accumulated in said spring is sufficient to overcome the friction between the shoe 539 and its casing 526.

As already described, the indicator drums 525 are restrained from clockwise rotation by the levers 544 which engage one of the eleven teeth in disc 542 and since the casings 526 are secured to the drums 525 they too are thereby restrained from rotating.

At a definite position in each indicator drum is secured spring leaflet 564 part of which recedes away from the drum wall and is provided with a slot 563. In the shafts 519 at points horizontally opposite the slots 563 of the leaflets 565 are disposed perpendicular arms 561 having at their extremities hook portions 562. All of the arms 561 of each shaft 519 are in parallel alignment throughout the length of the shafts and are so provided that when they are rotated clockwise with the shaft 519 upon encountering the spring leaflet 564 they cam the latter members away and continue in movement but when said arms 561 are stationary and said drums allowed to rotate in counter-clockwise direction the hook portions 562 upon encountering the slots 563 thereby stop the further rotation of the drums.

After having positioned each of the shafts 519 in a selected position one or more of the range magnets 306 to 315 of a particular stock is then actuated thereby releasing a horizontal row of four indicator drums to yield to the influence of their coil springs 536 and respond by rotating in counter-clockwise rotation. As each of the leaflets 564 of the respective drums encounter its corresponding arm 561 its slot engages the hooked portion 562 of said arm and the drum is arrested. In this arrested position the drum 525 displays a digit in registration with the opening 523 of the frame 522 that corresponds to the particular price selection.

It is to be noted that there is normally at all times some tension in each of the indicator springs 536 and that should any other range magnet in the same section of the quotation board be actuated its set of drum dials would also move to the position of the settings upon the shafts 519 but since none of the remainder of the range magnets are actuated their dials are not disturbed in their previous settings.

In order to make the operation of the dials more clear, specific operations will now be described referring again to Figs. 7 to 9 and 16 to 21 and taking the position of the several dials in the illustrations as a starting point. Suppose that it is desirable to change the top dials 514 so that the units' indicator shall read 9 instead of 2. The complete signal is received over the distributor 183 during eight revolutions thereof and during each such revolution a set of impulses are channeled over each of the secondary distributor segments to which are connected the wires 251 to 257, 261 to 267 and 271 to 275. From there three permutation signals go to the stock selector and five to the storage relays. The three permutation signals which go to the selector (see Fig. 10) each comprise five electrical impulses and each impulse is channeled to one of the fifteen magnets 5. The word "impulses" is used in a special sense in this connection meaning in fact impulse intervals during which either of two line conditions may occur such as current and no-current conditions. As described in connection with the stock selector these three signals effect the closure of a contact 9 setting into operation a corresponding motor 61.

Of the other five signals four after passing through the storage overlap continue over lines 376 to 391. Each of these four signals comprise but four impulses hence they total but sixteen passing over the mentioned sixteen lines simultaneously to the sixteen magnets comprising the four sets 25 to 28. By each magnet 25 to 28 controlling one disc 475 in accordance with its being a current or no-current condition, the several magnets install a permutation of positions upon the several discs 475 camming out the previously selected rod 486 and selectively positioning a new one. Thus in accordance with the proposed change to be affected the code disc selector or price setting unit of the units vertical shaft will have its discs 475 so changed as to admit into selective position that one of the rods 486 whose interposition into the path of arm 491 will arrest the units shaft 467 in the proper place at which it, in turn, may stop released indicators so as to display the character 9 through its window 523.

This is accomplished in rapid succession of movements as follows. As soon as the previous rod 486 is cammed out of the path of arm 491 it allows shaft 467 to rotate under influence of friction clutch 471 until the character 9 rod 486 is permitted to drop into selective position whereat it again arrests shaft 467 but this time in the "9" position. While this is occurring the hundreds, tens, and fractions shafts are doing likewise and accordingly are establishing new positions or reestablishing the previous ones depending upon how the new quotation differs from that which had been previously recorded on the particular indicators.

Immediately after all of the shafts have had time to assume their new positions the secondary distributor brush 232 is timed to encounter its segment 239 causing the energization of a corresponding marginal relay 285. This in turn closes a set of contacts 286 to 292 over which the final or 8th signal is then permitted to pass to the corresponding relays 306 to 310. This final signal is comprised of five impulses and of these, those during which a current interval exists cause the energization of their corresponding magnets 306 to 310. In the instant example, only the top indicator will be thus operated so that accordingly magnet 306 will be energized while magnets 307 to 310 will remain unenergized. The movement of the armature 552, Fig. 15, of magnet 306 causes the horizontal displacement of its associated rack bar 546 and the four appurtenant arms 544 out of blocking engagement with their four associated toothed wheels 542. This permits the four horizontal indicators freedom to rotate in response to their individual springs 536 in a clockwise direction as viewed in Fig. 16 until their spring leaflets 564 encounter their respective projecting hook arms 562 whence they are arrested in their new position. In the instant case this new position for the units indicator is such that the character 9 is displayed through the opening 523 instead of as previously the character 2 had been thus displayed.

It will be understood that as many of the magnets 306 to 310 may be energized as is desirable in response to a single complete stock signal of eight subordinate signal intervals but that in each case the corresponding horizontal row of indicators will be made to register the same quotation. Where it is desirable to indicate separate quotations such as, for example, to change the indication of dial 515 from 3 to 8 this must be done by sending a new stock selecting signal in toto. The response to a new signal will be similar to the one just described except that the units shaft 467 will now be brought to rest at the "8" position and the magnet 307 will be energized instead of as previously 306 was energized.

In like manner, any of the magnets 306 to 310 may be individually energized in response to a special stock quotation signal and accordingly its row will indicate a price differing from that of the other rows for while one of the magnets 306 to 310 is energized the remainder of them remain inactive holding their blocking arms 544 constantly in engagement with the teeth 543 of their associated wheels 542 and against the tendencies of their springs 536 to rotate their drums 525.

The stock selector, Figures 10 to 14, comprises a frame 571 in which are mounted a series of slidable permutation bars 572. In the present instance there are fifteen such bars 572, corresponding to the three five code selectors, and responsive to a stock designation composed of three letters or characters. The permutation bars 572, are under tension of individual springs 573 each secured to its associated bar at one end and to the framework at the other end. At one end of each of the permutation bars 572 is a spring pressed lever 574 pivoted at 575 on member 576 normally held in an unoperated position by engagement with a notch 577 in a lever 578 and urged clockwise about its pivot by spring 579. The lever 578 pivoted at 581 is urged counterclockwise by the spring 582. When lever 574 is held by lever 578 in its unoperated position, permutation bars 572 are permitted to move to their extreme upward position under tension of springs 573, but not far enough to engage the tip of lever 574. Engaging a projection on each of the levers 578 is a plunger 583 which extends through a guide passage in the frame and the outer end of which engages a screw 584 adjustably mounted in the end of armature 585.

When a magnet 5 is energized, armature 585 is attracted towards it and through plunger 583 rocks lever 578 clockwise against the action of its spring 582 releasing lever 574 and permitting the tension of spring 579 to be transferred to permutation bar 572. This has no effect at this time, however, as bar 572 is locked by a bail 586 carried on arms 587, pivoted at 588, the operation of which will be described in the following.

Located transversely of permutation bars 572 is a series of selector bars 591. The selector bars 591 have projections 592 peculiar to each permutation bar and the permutation bars have slots cooperating with all of said selector bars. The slots and projections in both cases are equally spaced on the bars. The projections 592 on the selector bars 591 are bent to the right or left depending upon whether the corresponding permutation bar is in its right or left hand position when that particular selector bar is to be operated. Each selector bar will have its lugs bent in a different arrangement of right and left hand positions, according to the permutation corresponding to that selector bar. The lugs are bent in one direction for operated permutation bars and to the other direction for unoperated permutation bars. It will be noted then that if the permutation bars are set corresponding to a certain received signal, the selector bar corresponding to this signal and having its lugs bent in a corresponding manner will have each of its lugs aligned with a slot in the corresponding permutation bar and be permitted to operate as described later.

The selector frame 571 has mounted therein a rotatable shaft 593. On shaft 593 and adapted to rotate therewith and slide longitudinally thereon is the clutch driven member 594. The clutch member 594 is normally held out of engagement with clutch member 595 by stop arm 596 against the action of spring 597. Stop arm 596 engages a cam lug 598 on clutch member 594. Stop arm 596 is normally held into engagement with the lug 598 against the action of spring 602 by pawl 599 attached to armature 600 of magnet 284 the said armature being pivoted at 601. When magnet 284 is energized as described above, stop arm 596 is released and allowed to move to the right under tension of spring 602 and shaft 593 starts to rotate and makes a complete revolution when cam lug 598 again engages arm 596 which has been restored by a suitable cam and releases the clutch, pawl 599 having been restored to its locked position in the meantime.

Rotatably carried on shaft 593 are two cams 605 and 606. Cam 605 is in operative relation with member 607 pivoted at 608 and carrying a lever arm 609 pivotally connected thereto as indicated at 610. The lever arm 609 is pivotally connected at the opposite end thereof as at 611 to one end of a selector restoring arm 612 pivotally mounted on pin 613 and carrying a universal member 614. When shaft 593 rotates, initiated by the energization of magnet 284, cam 605 moves lever 609 to in turn rock member 612 about its pivot 613, and thereby rock universal bar 614 to the left to move all the selector bars 591 to the left against the action of their springs 617 so that all their lugs clear the permutation bars 591.

At the same time, locking bar 586 is moved downward through arm 615 and is disengaged from notches in the permutation bars with which it engages. The permutation bars 572 corresponding to magnets which have not been energized since the previous cycle, will move upwardly under tension of spring 573 individual to each of those bars and the bars corresponding to the magnets which have been energized, will move downwardly under tension of springs 579. As lever 607 returns, universal bar 614 permits the selector bars 591 to move to the right and a selected contact 618 is closed. At the same time locking bar 586 again enters the notches of the permutation bars. In the cycle of operations, described in the above, upon energization of magnet 284 the shaft 593 now starts rotation, the previous selection is restored. As the rotation continues, the new selection is set up. The time for this operation is such that the new selection will not be set up until brush 232 has moved off of segment 239.

The cam 606 is in operative relation with a cam 621 rotatably supported on the end of one arm of a bell crank lever 622 pivotally supported at 623 and carrying on the end of the other arm thereof a universal restoring bar 624 for engagement with notches 625 in levers 574. The cam arrangement is such with respect to the cam 605 as to function just preceding the operation of the latter to kick the levers 574 counterclockwise releasing members 578 and permitting restoration of the previously operated bars 572.

It will be understood that a unit as shown will have selector bars corresponding to only a fraction of the total possible number of permutations of 15 elements. In any particular case any number of these units may be used and while all the units will operate for each signal only one selector bar will operate in one of the units. If a signal is received corresponding to a stock not represented on a particular board, no selector bar will be operated. It will also be noted that by merely removing one of the selector elements another having a different combination of bent lugs may be substituted and thereby change the stock quoted in that particular position.

The operation of the system in connection with the circuits and apparatus will now be described.

The tape 71, Figure 5, is perforated in accordance with code combinations of impulses. These codes are arranged in groups which for the present illustration comprises eight code combinations each and each group is referred to as a cycle of operation. Each such group comprises three code combinations which are arranged to make an item selection followed by four codes of five impulses each for operation of the quotation of the selected item though only four impulses are effective and a fifth code of five impulses for making a range selection. Although in the present illustration, such codes are shown in a predetermined order, it will be obvious that any desired sequence may be employed. The tape also is provided with a sixth perforation at the beginning of each cycle.

The tape 71 perforated in this manner is now fed in a step by step manner through the transmitter and into operative relation with the feelers 103 of the levers 101. The levers 101 are normally held from engagement with the tape but are periodically released so that their feelers may move into the tape and when so operated they in turn control contactors which through the distributor 133 transmit code combinations of impulses over the line 156. Each of these code combinations in a cycle is preceded by a start and stop impulse of a certain polarity, while the first group of each cycle has a start and stop impulse which is the reverse of the start and stop impulse of all the other codes in the cycle. These code combinations of impulses are transmitted over the line 156 and operate a receiving relay 171 which in turn controls the starting and stopping of the distributor 183. Inasmuch as the start and stop impulse for the first code of each cycle is different from the start and stop impulse of the succeeding codes, the distributor 183 not only must be in synchronism during each revolution with the distributor 133 but must also be in proper phase relation with respect to the successive codes in a cycle; that is, it will be in position to receive the first code of the cycle when the first code is being transmitted by the transmitting distributor and will similarly be in position to receive each of the succeeding codes. Unless it is in this condition, it will not be in a condition to start upon the receipt of the start impulse of the first code, which as explained above is different. Distributor 183 is in electrical operative relation with the distributor rings 221 to 225.

The distributor rings 221 to 225 function to distribute the successive codes in a cycle to their proper mechanism. Although as explained above, the arrangement is such that the first three codes are the item selecting codes and the first set of segments of the rings 221 to 225 are accordingly arranged to distribute these first three codes received to the item selecting mechanism, it will be obvious that any other arrangement than that shown may be employed. As has also been explained the speed of rotation of the brushes 216 to 220 is such that it will rotate over each segment during the period that the brushes of the distributor 183 make one complete revolution.

The first three codes selectively operate the selector magnets 5 which as described in detail above in connection with Figures 11 to 14 close one of the contacts controlled by the bars 8, Figure 8, and complete an energizing circuit for the selecting relay 285 and motor control magnet 56 in series. Inasmuch, however, as the selecting magnet 285 is a marginal relay the current flow through the particular circuit is not sufficient to energize this relay although the circuit therefor is closed. The motor 61 now starts into rotation and drives four vertical shafts 466 to 469, Figure 20, which control all the indicators in a vertical column in which the selected item is located. All of these shafts, however, are in frictional engagement with the motor and do not rotate at this time due to the fact that one of the stop arms 486 on each of the shafts is in its lower position and in engagement with the stop arm 491 of each shaft so that these shafts are now locked from rotation, although in preparation for rotation by reason of the rotation of its individual motor.

Immediately following the receipt of the first three codes, the next four codes which are the quotation codes are received and these are stored in relays 356 to 360 and 371. The relays 356 to 360 and 371 are now energized and locked by reason of the fact that the relay 363 is also energized at this time. At the end of this first cycle or rather when all of the codes therefor have been received an item has been selected and conditioned for operation.

The brushes 216 to 220 and brushes 206 to 210 and 231 to 237 are returned to the position shown in Figure 7 and are in condition for receipt of the second cycle of codes.

While this second cycle of codes is being received to operate the selector magnets 5 as in the case of the first cycle, the circuit for the relay 285 is multipled so as to by-pass the resistance 401 over the segment of ring 239 as has been explained in detail above and the relay 285 energizes and in turn locks itself. The relay 285 also prepares a circuit for the range relays 306 to 310 and completes an energizing circuit for the relay 33.

Simultaneously the transfer relay 343, Figure 8, is energized and the relays 336 to 340 and relays 374 are now operated in accordance with the operation of the relays 356 to 360 and 371 by the previous code, this all occurring, it will be recalled during the receipt of the codes of the second cycle. The relays 336 to 340 and relays 374 when energized remain energized and locked over the armature of relay 366 which is also energized at this time and in turn transfer their conditions over the contacts of the armatures of the relay 285 to the range relays 306 to 310.

It will be recalled that the relays 336 to 340 have been energized in accordance with the range selection. The relays 374 which have been energized in accordance with the price signals received now repeat their operation through the armature 32 of connector relay 33 to the selector relays 25 to 28.

The selector relays 25 to 28 variably operate a set of notched disk members 475 which are arranged on each of the four shafts 466 to 469, the extreme left hand set of disks being operated in accordance with the code for the hundreds quotation, the next in accordance with the tens quotation, the third in accordance with the units quotation and the extreme right hand set of selectors in accordance with the fractions quotation. These disks, upon operation, as is well known in the art cam out the levers 486 which may have dropped into an aligned set of notches and set up a new alignment of notches.

The bar 486 above this new alignment now drops into the aligned notches and the associated shafts 466 to 469 are free to rotate by their motor 460 until the stop arm 491 on each of these shafts engages the arm 486 which has dropped into the aligned notches. In this manner, the four shafts are rotated through predetermined angles in accordance with the quotation codes received. The shafts 466 to 469, as explained above, are in turn connected through gearing mechanism to individual vertical shafts 505 which extend through a series of indicators in a vertical column and in turn drive individual shafts 519 of each set of indicators in a column.

As previously explained the shafts 519 are each moved to a selected position though the particular indicators themselves may not instantly respond to assume this positionment since they are latched against rotation by the slide bars 546 and the blocking arms 544 secured thereto. As soon, however, as the range code signal is effective to operate one or more of the range magnets 306 to 315 of a selected stock its slide bar is then operated to move the four blocking arms 544 secured thereto out of interference with the teeth 543 of their corresponding disks 542. The four indicators of each slide bar 546 thus operated will then respond to the urge of their respective springs as already explained in connection with the structure of the indicators, and assume settings in accordance with their shafts.

The above operations all occur during the cycle following the cycle in which the codes therefor have been received. During this time the relays 356 to 360 and relays 371, are operated in accordance with the second set of code signals, having however, previously been restored to normal by momentary deenergization of the relay 363. Relay 343 is also at this time held open. The selector relay 285 is deenergized at the beginning of the third code and before the succeeding selecting relay is energized when its locking circuit is opened as explained in detail above.

This cycle of operations is now repeated for each quotation received. When the transmission of quotations has been completed, conditions are established for a further cycle of rotation of transmitting distributor 133. Such distributor, due to the position of contacts 146—150, will transmit a blank signal, but during its rotation will establish a condition for releasing for a further cycle, receiving distributor 183 (Fig. 7). Rotation of such distributor will cause operation of transfer relay 343 to transfer the selection impressed on the first group of relays to the second group of relays so that the sgnal combinations stored therein will effect the operation of the respective selector mechanisms 25—28. Consequently, with the receiving distributor making an extra revolution, the control of the last received code combination of signaling conditions will be exercised and the display board operated accordingly.

Although I have disclosed my invention in connection with a preferred adaptation thereof, it will be understood that other applications thereof well known in the art come within the scope of this invention and I intend to limit myself only as indicated in the appended claims.

What I claim is:

1. In a signaling system, a receiver comprising a receiving distributor, a secondary receiving distributor, selecting and indicating mechanism, means whereby said first receiving distributor receives code combinations of impulses, means whereby the second distributor distributes the received code combinations of impulses to said selecting and indicating mechanism in accordance with the sequence of the received code, said secondary distributor comprising a first section for receiving said received code in accordance with the sequence and a second section for providing an overlap whereby said receiver may be operated in accordance with a new code while said indicating mechanism is operated in accordance with the previous code.

2. In a signaling system, a transmitter for transmitting code combinations of impulses, a receiver comprising a plurality of groups of indicators, motor mechanism for each group of indicators for moving them into selected position, means responsive to code combinations of impulses for selecting certain of said indicators for operation, means responsive to this selection for starting the motor individual to the group in which said selected indicator is located for operation, and means responsive to other of said code combinations of impulses for selectively applying the power from said motor to said selected indicator whereby said indicator is variably operated in accordance with received code combinations of impulses.

3. In a signaling system, a transmtting station for transmitting code combinations of impulses, a receiving station responsive to said code combinations of impulses, a plurality of sets of indicators, a plurality of groups of indicators in each set, a motor for each set of indicators, means responsive to certain of said impulses for selecting a set of indicators, means responsive to said selection for starting the motor individual to said set into operation, means responsive to other impulses for selecting a group of indicators in said set and means responsive to other combinations of received impulses for variably controlling the application of power from said motor to certain of said selected indicators.

4. An indicator-board comprising a plurality of alined individual indicators, a common shaft upon which said indicators are mounted, spring elements and frictional connection between said indicators and said common shaft whereby the rotation of said shaft in one sense impels corresponding movement of said indicators through said spring and frictional connections, engagement arms secured to said shaft disposed to positively engage said indicators upon reversed relative motion between said shaft and indicators, and latching means individual to said indicators for restraining their movement with said rotating shaft.

5. The combination set forth in claim 4 and electro-responsive means for controlling said latching means.

6. The combination set forth in claim 4 and a selector for stopping the shaft in predetermined positions.

7. In a signaling system, a transmitting station, a receiving station, a single line of communication between said stations, means at said transmitting station for sending over said single line unit cyclic permutation code messages comprised of operating signals and routing signals, a plurality of rotatable indicators at said receiving station disposed in grouped alinement and normally latched against rotation, a common rotatable shaft for each of said groups, resilient frictional driving connections between said shaft and its indicators, motors for rotating said shafts, and means at said receiving station including a receiving distributor for channelling said operating signals in accordance with said routing signals whereby certain of said operating signals position said common shafts and certain other of said operating signals release predetermined ones of said indicators.

8. In a signaling system, the combination with a plurality of individual indicators mounted upon and movable by common selector shafts, of means for transmitting quotation messages comprising routing signals and operating signals, means for receiving said signals, and means under control of said routing signals for delegating certain operating signals to effect movement of said shafts and certain other of said operating signals to render corresponding indicators movable by said shafts.

9. In an indicating and display system, a plurality of indicators, each indicator containing a release magnet, an indicator operating shaft common to all said indicators, means for setting said shaft in a desired position, and means for operating the release magnet of any one of said indicators, and means responsive thereto to bring the indicator into a position corresponding to the set position of the shaft while allowing the rest of the indicators to remain in their respective previous positions.

10. In a stock-quotation receiving board, a plurality of mechanical, rotatable indicators, said indicators being arranged in horizontal and vertical rows, a vertical shaft for each vertical row, said shafts being arranged to be operated together in groups, means for setting the shaft groups in accordance with a plurality of digits respectively, and means for bringing any desired indicator into a position to indicate the setting of the associated shaft.

11. In an automatic quotation display board, the combination of a plurality of register units each having a plurality of figure-display registers arranged in due numerical orders, common driving means associated with the registers of the respective orders of numerals of the several register units, means for selecting and directing said driving means to respective numerical positions, means for selecting a register unit for adjustment, means for selecting the registers of such register unit associated with the selected driving means, and means for adjusting said selected registers to the respective numerical positions of the driving means.

12. In an automatic quotation display board, the combination of a plurality of driving means, impulse responsive means for directing predetermined driving means to a given numerical position, a plurality of register units operatively associated with said driving means, each of said units having a plurality of registers, means for selecting a predetermined register unit, and means independent of said driving means for adjusting the registers of the selected register unit to the numerical position of the several driving means.

13. In an automatic quotation display board, the combination of driving means, selective means for directing said driving means to given numerical positions, a plurality of register units each having a plurality of registers associated with said driving means, means for selecting a register unit, means for selecting one or more registers within the selected unit, and means for adjusting the selected register to the numerical position of the driving means.

14. In a signaling system, a plurality of indicators for posting digits of stock quotations, a plurality of common shafts, each for operating a number of said indicators, means operable over a relatively small number of impulse channels for selecting any desired indicators, means whereby relatively small numbers of impulses in coded time relationship arriving over said channels are caused to control the operation of said shafts in accordance with the digits to be posted, and means for placing the selected indicators under the control of said shafts to display the digits.

15. In a receiver for use in a signaling system, indicators for posting the varying quotations of stocks or other items, common operating members, each for operating a number of the indicators, means responsive to received groups of impulses in code for selecting a group of said indicators and for setting the operating members in accordance with the digits to be posted, and means for causing the selected indicators to take up corresponding settings, while maintaining the unselected indicators in their previous respective positions.

16. In a receiver for use in a stock quotation system, groups of indicators for posting the stock quotations, indicator-controlling shafts each common to corresponding indicators of each group, means controlled from a distance for starting said operating shafts into operation to take up positions corresponding to the digits of a quotation, and means also controlled from a distance and effective while said shafts are in operation to receive and store an indication of an indicator group to be controlled by said shafts.

17. In a stock quotation receiver, indicators each assigned to a separate stock, a shaft common to said indicators for controlling the settings thereof, means for predetermining a setting of said shaft and for operating said shaft to take up the predetermined setting, and means effective while said shaft is operating to take up the predetermined setting for selecting an indicator to be controlled by the shaft.

18. In a stock-quotation receiving and display board, rotatable indicators arranged in rows, a separate shaft for each separate row, means for operating each of the shafts to take up a setting corresponding to a quotation digit, means for bringing any desired indicator into a position to display the digit corresponding to the setting of the associated shaft, and means effective while the shafts are being operated to take up said settings for selecting desired indicators to be reset.

19. In a quotation receiver for recording prices of several items, a plurality of groups of digit registers, one for each range of an item the price of which is to be displayed, a shaft common to the corresponding digit register of each group of registers, latching means for normally preventing rotation of said registers with their shaft, selector mechanism responsive to code combinations of signaling conditions for controlling the degree of rotation of said shaft, and means responsive to signaling conditions identified with the range of the item for releasing all of the digit registers of a group of registers for rotation with said shafts.

20. In a signaling system, a plurality of sets of character indicating means divided into groups, a selector mechanism for each group responsive to code combinations of impulses for controlling its corresponding group of indicating means, motor means individual to each selector mechanism, means for selectively selecting in response to a received code combination of impulses one of the groups of indicating means and a set of indicating means in said group and starting the motor means associated with the selector mechanism individual to said group of indicating means by the same code combination of impulses, and means responsive to other received code combinations of impulses for selecting certain indicating means of the selected set of indicating means for operation by the selected selector mechanism.

21. In a receiver, a plurality of groups of shafts, a character wheel for each of said shafts, a separate motor means for each group of said shafts, means selectively operated for starting the motor for each group into operation for driving all of its shafts, means responsive to received variable code combinations of impulses for simultaneously determining the positions to which all of said shafts of a group will be set by power from their motor in accordance with different code combinations of impulses, and means for variably operating one or more of said character wheels in accordance with the position of said shafts.

22. In combination, a plurality of rotatable registers, means for normally latching said registers to prevent rotation thereof, a selector common to all of said registers including a plurality of individually selectable mechanical elements, means in the selector responsive to received code combinations of signaling conditions for operating the mechanical elements according to the received code combinations, means responsive to other signaling conditions for releasing the latch of one of said registers, and means whereby the angular rotation of said released register is thereupon determined by the mechanical element operated by the means in the selector.

23. In a quotation receiver, a plurality of registers, one for each index of an item such as close, open, high, low, and last, similar registers for each of a plurality of items, means identified with each of the items and controlled by signal impulses for conditioning the registers thereof for operation, a shaft common to each of said registers, a selector common to all of said registers for operating said shafts in accordance with the received code combinations of signaling conditions, and means responsive to other signaling conditions identified with the index of the item for selecting one of the registers of the conditioned register to be operated in accordance with the operation of said shafts.

24. In a signaling system, a receiving station, a distributor at said station, a selector operatively connected to said distributor responsive to received code combinations of impulses transmitted from said distributor, electromagnetic means responsive to the variable operation of said selector, a plurality of groups of indicators each group of indicators including a plurality of sets of indicators, means individual to each set of indicators and responsive to the energization of said electromagnetic means for conditioning the indicators for operation, motor means individual to each group of indicators started into operation through the energization of said electromagnetic means for the group and set of indicators to be positioned, a secondary selector responsive to other received code combinations of impulses for selecting one or more of said means individual to the sets of indicators, means responsive to still further code of combinations of impulses for determining the position of the selected set of indicators, and means operated by the motor means for setting the indicators in accordance with the determined position.

25. In a signaling system, a plurality of sets of indicating devices, a selector mechanism for each set of devices, motor means individual to each selector mechanism for supplying power thereto, means responsive to a received code combination for selecting a selector mechanism in accordance with the received code combination, means responsive to the selection of a selector mechanism for starting the motor therefor, means responsive to code combinations of impulses for variably controlling each set of selector mechanisms during their operation by the motor means, and means in said selector mechanism to operate said indicating devices variably.

26. In a signaling receiver, a rotatable shaft, a plurality of character indicators having means whereby they may be positioned as determined by the position of said shaft, selector mechanism responsive to code combinations of signaling impulses for controlling the angular position of said shaft, relay means for selectively establishing through its contacts electrical circuits, and means under the control of said circuits whereby certain of said indicators assume a position determined by the angular position of said shaft.

27. In a signaling receiver, a plurality of rotatable shafts, a plurality of indicators having means whereby they may be positioned as determined by the position of said shafts, a selector mechanism for each shaft responsive to received code combinations of signaling conditions for controlling the angular position of its shaft, means responsive to other received code combinations of signaling conditions for selecting certain of said indicators on several of said shafts for simultaneous operation, and means under the control of said last mentioned means for causing the selected indicators to assume positions corresponding to the angular positions of said shafts.

28. In a signal receiver, a plurality of rotatable shafts, one for each digit of a price quotation, a plurality of indicators having means whereby they may be positioned as determined by the positions of said shafts, a selector mechanism for each shaft responsive to received code combinations of signaling conditions for determining the position of its shaft, and means whereby the digit indicators for a price quotation operate concurrently to positions determined by the positions of said shafts.

29. In a stock quotation system, a telegraph circuit, means for transmitting code signals identified with an item and its price over said circuit, said items being divided into groups, a receiving distributor connected to said circuit, a storage device for storing the signals relating to the item selection as distributed by said distributor, a storage device for storing the signals relating to the price as distributed by said distributor, a plurality of indicators for each item, means for selecting certain indicators of one item by the signals for the item stored in the storage device for the item signals, a plurality of channels, one for each group of items, a plurality of price selectors, one for each channel, means responsive to code signals for the items for selecting the price selector of the channel to which the item being quoted is assigned, and means operated by the selected price selector for operating the selected indicators as determined by the impulses stored in the price storage device.

30. In a stock quotation system, the combination of an indicator board comprising two sections, each of which includes a plurality of groups of indicators and each of which includes indicator controlling apparatus common to all of the said groups in one of said sections, duplicate indicator controlling apparatus for the other of said sections, a receiving distributor common to both said sections, and means common to both of said sections for selecting for operation any group of indicators on either of said sections in response to signals received through said distributor.

31. In a stock quotation system, the combination of an indicator board comprising two sections, each of which includes a plurality of groups of indicators and each of which includes indicator controlling apparatus common to all of the said groups in one of said sections, duplicate indicator controlling apparatus for the other of said sections, a receiving distributor common to both said sections, means common to both of said sections for selecting for operation any group of indicators on either of said sections in response to signals received through said distributor, and means for conditioning for operation said apparatus pertaining to the one of said sections which includes said selected group of indicators.

32. In a stock quotation system, the combination of an indicator board comprising two sections, each of which includes a plurality of groups of indicators and each of which includes price setting apparatus common to all of the said groups in one of said sections duplicated for the other of said sections, a receiving distributor common to both said sections, and means responsive to signals received through said common distributor and operative to select any of said groups of indicators and to select also the price setting apparatus specific to said selected group.

33. In a stock quotation system, the combination of an indicator board comprising two sections each of which includes a plurality of groups of indicators, a receiving signal distributor, selecting means responsive to signals from said distributor and effective to select any group of indicators in either section, price setters for said groups of indicators, one price setter for each of said sections, and price setter control means responsive to signals from said distributor and effective to control all of said price setters.

34. In a stock quotation system, the combination of an indicator board comprising two sections each of which includes a plurality of groups of indicators, a receiving signal distributor, group selecting means responsive to signals from said distributor and effective to select any group of indicators in either section, price setters for said groups of indicators, one price setter for each of said sections, and price setter control means responsive to signals from said distributor including overlap storage means and effective to control all of said price setters.

35. In a stock quotation system, the combination of an indicator board comprising two sections, a plurality of groups of indicators in each of said sections, a receiving signal distributor for distributing incoming signal impulses, a single selecting means responsive to signal impulses distributed by said distributor and effective to select a group of indicators on either of said sections, means for operating indicators of a selected group, and means also responsive to signal impulses distributed by said distributor for determining the operation of the indicator operating means and the display of the quotation.

36. In a stock quotation system, the combination of an indicator board comprising two sections, a plurality of groups of indicators in each of said sections, a receiving signal distributor for distributing incoming signal impulses divided into indicator selection and indicator operation signal impulses, a selecting mechanism responsive to each of the indicator signal impulses distributed by said distributor and effective to select a group of indicators on either of said sections, means for operating the indicators of the selected group, and means responsive to the indicator operation signal impulses for determining the operation of the indicator operating means and the display of the quotation.

STERLING MORTON.